United States Patent [19]
Ishikawa et al.

[11] Patent Number: 5,794,258
[45] Date of Patent: Aug. 11, 1998

[54] SYSTEM FOR TRANSMITTING FIGURE DATA WITHIN A RETRIEVABLE RANGE ACCORDING TO THE DATE AND TIME OF UPDATE

[75] Inventors: Yoichi Ishikawa, Ichikawa; Hiroto Sato, Hoya; Kiyoshi Yoneyama, Yokohama, all of Japan

[73] Assignee: Tokyo Gas Co., Ltd., Tokyo, Japan

[21] Appl. No.: 615,245

[22] PCT Filed: Jul. 27, 1995

[86] PCT No.: PCT/JP95/01493

§ 371 Date: May 6, 1996

§ 102(e) Date: May 6, 1996

[87] PCT Pub. No.: WO96/04606

PCT Pub. Date: Feb. 15, 1996

[30] Foreign Application Priority Data

| Jul. 29, 1994 | [JP] | Japan | 6-197531 |
| Aug. 31, 1994 | [JP] | Japan | 6-230450 |
| Aug. 31, 1994 | [JP] | Japan | 6-230451 |

[51] Int. Cl.$^6$ .................. G06T 1/00; G09B 29/00
[52] U.S. Cl. .............. 707/502; 345/331; 707/511
[58] Field of Search ................ 395/762-3, 772, 395/776, 777, 329, 331, 332; 707/502, 511-2, 501; 345/329, 331-2

[56] References Cited

U.S. PATENT DOCUMENTS

| 4,675,676 | 6/1987 | Takanabe et al. | 340/995 |
| 5,043,919 | 8/1991 | Callaway et al. | 395/329 |
| 5,214,757 | 5/1993 | Mauney et al. | 395/331 |
| 5,416,902 | 5/1995 | Sato et al. | 395/763 |
| 5,471,205 | 11/1995 | Izawa | 359/995 |
| 5,491,780 | 2/1996 | Fyles et al. | 395/332 |
| 5,519,769 | 5/1996 | Weinberger et al. | 379/112 |

OTHER PUBLICATIONS

"Creation and Use of a Personal–Computer–Based Mobile Mapping System", 1992, Yoishi Ishikawa, 17 pages.

*Primary Examiner*—Joseph H. Feild
*Assistant Examiner*—Jae-Hee Choi
*Attorney, Agent, or Firm*—Oblon, Spivak, McClelland, Maier & Neustadt, P.C.

[57] ABSTRACT

A system for transmitting map data between a parent station and a child station. The child station extracts figure data from an optical disk, specifies the retrieval range and transmits it as data for extraction to the parent station. Upon receipt, the parent station extracts the figure data including the retrieval range from the database. Then the date and/or time of update of the figure data and also of the data for extraction are checked. When the date and/or time of the update of the data for extraction is earlier, the figure data is transmitted to the child station.

34 Claims, 31 Drawing Sheets

FIG. 6

10 FIGURE DATA

| LAYER NUMBER (52) | RECORD NUMBER (53) | DATE AND /ORTIME OF UPDATE (54) | $X_{min}$ | $Y_{min}$ | $X_{max}$ | $Y_{max}$ (55) | N (57) | $X_1$ | $Y_1$ | ......... | $X_N$ | $Y_N$ (59) |
|---|---|---|---|---|---|---|---|---|---|---|---|---|

FIG. 7

61 DATA FOR EXTRACTION

| FIGURE NUMBER 1 (63) | LAYER A 19931123 (65) | LAYER B 19930115 (67) | ......... |
|---|---|---|---|

| $X_1, Y_1$ | $X_2, Y_2$ | $X_3, Y_3$ | $X_4, Y_4$ |
|---|---|---|---|

RETRIEVAL RANGE

FIG. 8

71 DATA INDICATING THAT FIGURE DATA HAS NOT FURTHER BEEN UPDATED

ALREADY UPDATED

FIG. 13

| LAYER NUMBER | RECORD NUMBER | DATE AND /ORTIME OF UPDATE | $X_{min}$ | $Y_{min}$ | $X_{max}$ | $Y_{max}$ | N | -1 | 0 |
|---|---|---|---|---|---|---|---|---|---|

86-1

| $X_1$ | $Y_1$ | $X_2$ | $Y_2$ | $X_3$ | $Y_3$ | $X_4$ | $Y_4$ | -16 | 0 |
|---|---|---|---|---|---|---|---|---|---|

86-2

| $X_5$ | $Y_5$ | $X_6$ | $Y_6$ | $X_7$ | $Y_7$ | ...... | ...... | -999 | 0 |
|---|---|---|---|---|---|---|---|---|---|

| LAYER NUMBER | RECORD NUMBER | DATE AND /ORTIME OF UPDATE | $X_{min}$ | $Y_{min}$ | $X_{max}$ | $Y_{max}$ | N | -1 | 0 |
|---|---|---|---|---|---|---|---|---|---|

88-1

| $X_8$ | $Y_8$ | $X_9$ | $Y_9$ | $X_{10}$ | $Y_{10}$ | $X_{11}$ | $Y_{11}$ | -16 | 0 |
|---|---|---|---|---|---|---|---|---|---|

88-2

| $X_{12}$ | $Y_{12}$ | $X_{13}$ | $Y_{13}$ | $X_{14}$ | $Y_{14}$ | ...... | ...... | -999 | 0 |
|---|---|---|---|---|---|---|---|---|---|

| LAYER NUMBER | RECORD NUMBER | DATE AND/OR TIME OF UPDATE | $X_{min}$ | $Y_{min}$ | $X_{max}$ | $Y_{max}$ | N | −512 | 0 |

89-1

| $X_1$ | $Y_1$ | $X_2$ | $Y_2$ | $X_3$ | $Y_3$ | $X_4$ | $Y_4$ | −16 | 0 |

89-2

| $X_5$ | $Y_5$ | $X_6$ | $Y_6$ | $X_7$ | $Y_7$ | ...... | ...... | ...... | −16 | 0 | −1 | 0 |

89-3

| $X_8$ | $Y_8$ | $X_9$ | $Y_9$ | $X_{10}$ | $Y_{10}$ | $X_{11}$ | $Y_{11}$ | −16 | 0 |

89-4

| $X_{12}$ | $Y_{12}$ | $X_{13}$ | $Y_{13}$ | $X_{14}$ | $Y_{14}$ | ...... | ...... | ...... | −999 | 0 |

89-5

FIG. 27
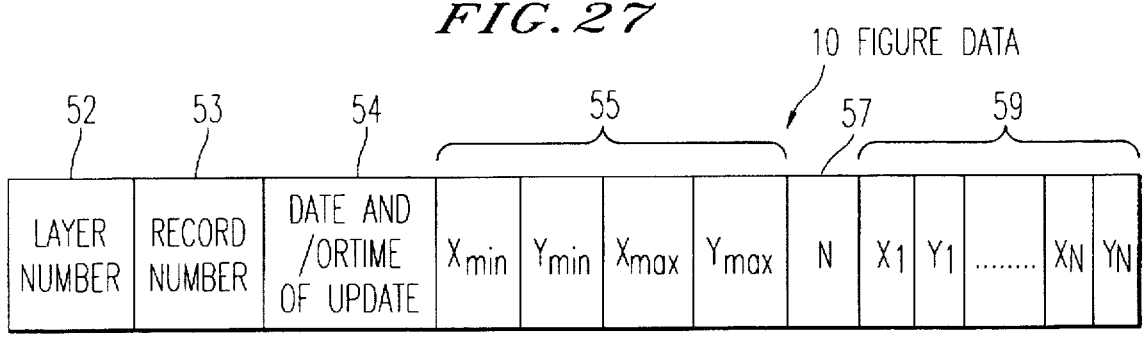
FIG. 28
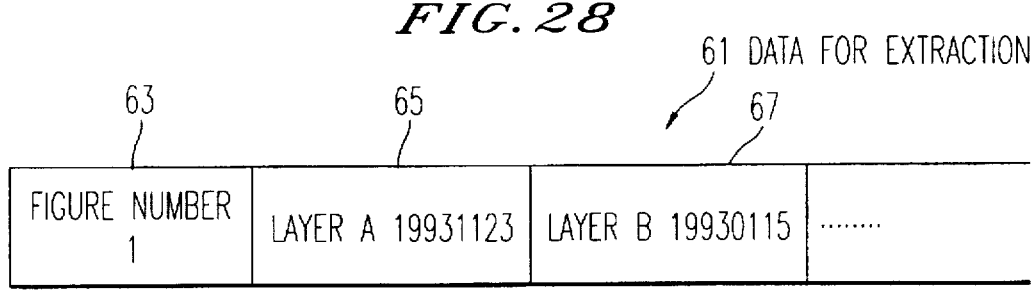
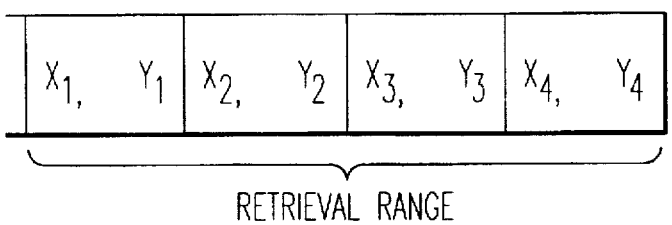
FIG. 29
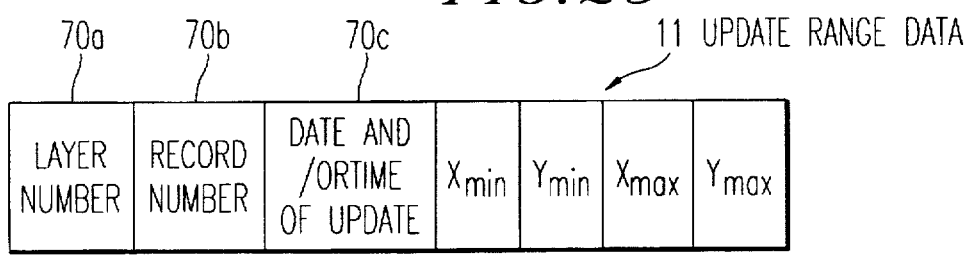
FIG. 30
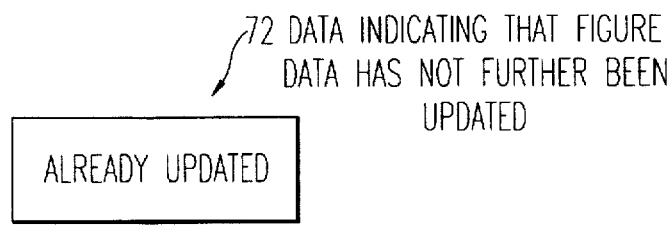

FIG. 35

| LAYER NUMBER | RECORD NUMBER | DATE AND /ORTIME OF UPDATE | $X_{min}$ | $Y_{min}$ | $X_{max}$ | $Y_{max}$ | N | -1 | 0 |
|---|---|---|---|---|---|---|---|---|---|

86-1

| $X_1$ | $Y_1$ | $X_2$ | $Y_2$ | $X_3$ | $Y_3$ | $X_4$ | $Y_4$ | $X_5$ | $Y_5$ |
|---|---|---|---|---|---|---|---|---|---|

86-2       86-3

| -16 | 0 | $X_6$ | $Y_6$ | $X_7$ | $Y_7$ | $X_8$ | $Y_8$ | $X_9$ | $Y_9$ |
|---|---|---|---|---|---|---|---|---|---|

86-3

| ... | -999 | 0 |
|---|---|---|

FIG. 36

| LAYER NUMBER | RECORD NUMBER | DATE AND /ORTIME OF UPDATE | $X_{min}$ | $Y_{min}$ | $X_{max}$ | $Y_{max}$ | N | -1 | 0 |
|---|---|---|---|---|---|---|---|---|---|

88-1

88-2

| $X_{10}$ | $Y_{10}$ | $X_{11}$ | $Y_{11}$ | -16 | 0 | $X_{12}$ | $Y_{12}$ | $X_{13}$ | $Y_{13}$ |
|---|---|---|---|---|---|---|---|---|---|

88-3

| $X_{14}$ | $Y_{14}$ | $X_{15}$ | $Y_{15}$ | ... | $Y_{14}$ | -999 | 0 |
|---|---|---|---|---|---|---|---|

FIG. 37

| LAYER NUMBER | RECORD NUMBER | DATE AND /ORTIME OF UPDATE | $X_{min}$ | $Y_{min}$ | $X_{max}$ | $Y_{max}$ | N | -512 | 0 |
|---|---|---|---|---|---|---|---|---|---|

89-1

| $X_1$ | $Y_1$ | $X_2$ | $Y_2$ | $X_3$ | $Y_3$ | $X_4$ | $Y_4$ | $X_5$ | $Y_5$ |
|---|---|---|---|---|---|---|---|---|---|

89-2

| -16 | 0 | $X_6$ | $Y_6$ | $X_7$ | $Y_7$ | $X_8$ | $Y_8$ | $X_9$ | $Y_9$ | ... |
|---|---|---|---|---|---|---|---|---|---|---|

89-3   89-4

| -16 | 0 | -1 | 0 | $X_{10}$ | $Y_{10}$ | $X_{11}$ | $Y_{11}$ | -16 | 0 |
|---|---|---|---|---|---|---|---|---|---|

89-5

| $X_{12}$ | $Y_{12}$ | $X_{13}$ | $Y_{13}$ | $X_{14}$ | $Y_{14}$ | $X_{15}$ | $Y_{15}$ | ... | -999 | 0 |
|---|---|---|---|---|---|---|---|---|---|---|

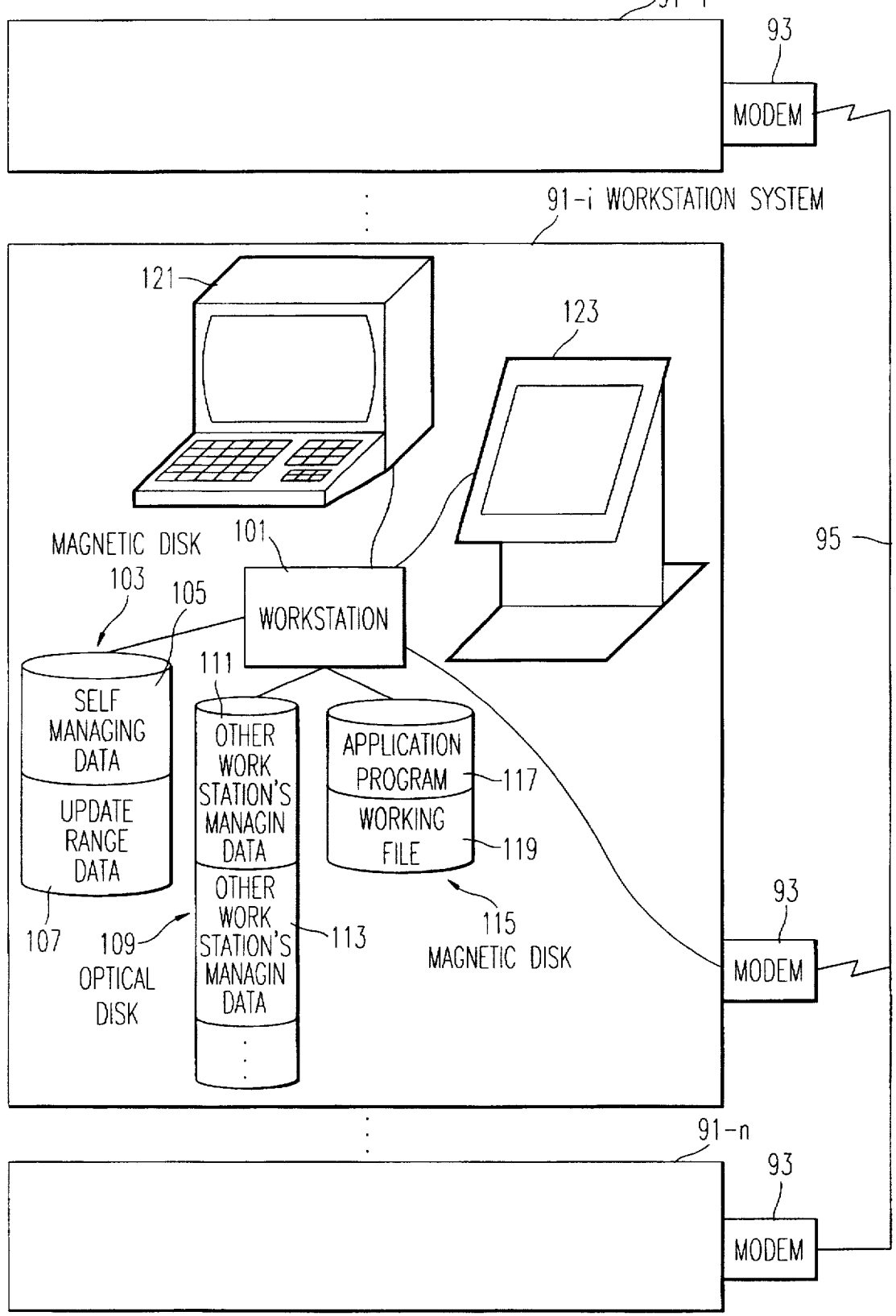

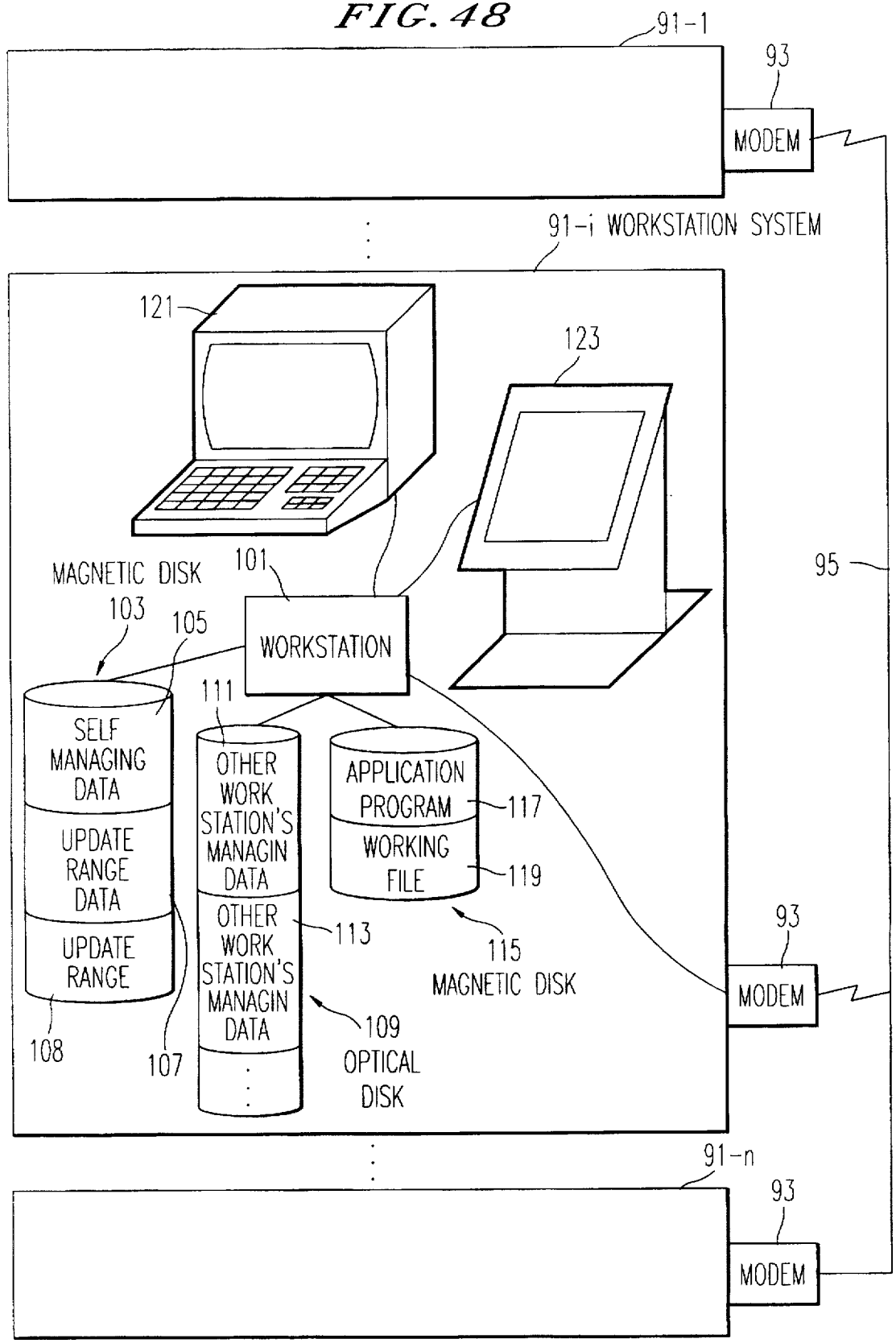

SYSTEM FOR TRANSMITTING FIGURE DATA WITHIN A RETRIEVABLE RANGE ACCORDING TO THE DATE AND TIME OF UPDATE

TECHNICAL FIELD

This invention relates to a system for transmitting data representing a map such as a detailed map on which public properties or facilities are indicated.

BACKGROUND ART

In a conventional mapping system, the geographical data and the facility data concerning public properties or facilities such as gas, electricity, waterworks and communications are stored in the large-sized mainframe computer of a parent station in order to maintain and retrieve the data. On the other hand, a personal computer (i.e., a computer of a child station) such as a small portable computer is used in a branch office or in an emergency car. A CD-ROM serving as an external memory medium, which contains the map data stored in the parent station is produced, for example, once a year. By reading the CD-ROM, the map data can be retrieved and displayed at a child station as well.

Incidentally, each time a gas facility and so forth is changed by a construction work, the facility data corresponding to the change is updated at a parent station. However, the facility data and so forth at a child station is not updated. This raises a problem that non-updated facility data must be used at a child station.

The present invention is made in view of the above problem and accordingly the object of this invention is to provide a system for transmitting data representing a figure, which enables to use updated data even at a child station.

DISCLOSURE OF INVENTION

The invention disclosed is a figure data transmitting system having a parent station and a child station, the parent station having data base and means for updating a figure data with a date and/or time of update, the figure data in the data base of the parent station being written into an external memory device, the external memory being sent from the parent station to the child station, the system comprising means provided at the child station for specifying a retrieval range at the child station and for transmitting the retrieval range and a date and/or time of update from the child station to the parent station; judging means provided at the parent station for receiving the retrieval range and the date and/or time transmitted from the child station, for comparing the date and/or time of update transmitted from the child station with a date and/or time of update at the parent station and for judging whether there exits a figure data updated after the date and/or time of update at the child station within the retrieval range or not; transmitting means provided at the parent station for transmitting an updated figure data to the child station when there exists the figure data updated after the date and/or time of update at the child station within the retrieval range; displaying means provided at a child station for displaying the updated figure data transmitted from the parent station.

In the above invention, the child station specifies a retrieval range and sends the retrieval range and a date and/or time of update to the parent station. The parent station receives the retrieval range and the date and/or time transmitted from the child station, compares the date and/or time of update transmitted from the child station with a date and/or time of update at the parent station, judges whether there exits a figure data updated after the date and/or time of update at the child station within the retrieval range or not, and transmits an updated figure data to the child station when there exists the figure data updated after the date and/or time of update at the child station within the retrieval range. The child station displays the updated figure data transmitted from the parent station. Therefore, the updated figure data may be used at a child station.

Another invention is a figure data transmitting system, wherein the parent station stores an update range data indicating a range of the updated figure, wherein the parent station receives the retrieval range and the date and/or time transmitted from the child station, compares the retrieval range with the update range data, compares a date and/or time of a update of a update range data at the parent station with the date and/or time of update transmitted from the child station, judges whether there exits a figure data updated after the date and/or time of update at the child station within the retrieval range, transmits an update range data and an updated figure data within the update range to the child station when there exists the figure data updated after the date and/or time of update at the child station within the retrieval range. The child station displays the figure data within the update range transmitted from the parent station. Therefore, the time required for data transmission may be reduced because the figure data within the update range is transmitted from the parent station to the child station.

Another invention is a figure transmitting system, wherein the parent station stores update data which is an updated figure data, wherein the parent station receives the retrieval range and the date and/or time transmitted from the child station, compares the retrieval range with the update range data, compares a date and/or time of an update of an update range data at the parent station with the date and/or time of an update transmitted from the child station, judges whether there exists whether there exits an update data updated after the date and/or time of update at the child station within the retrieval range, and transmits an update range data and an updated data within the update range to the child station when there exists the update data after the date and/or time of update at the child station within the retrieval range. The child station displays the update data within the update range transmitted from the parent station. Therefore, data extracting process may be expedited because the parent station retains the updated data in advance.

BRIEF DESCRIPTION OF DRAWINGS

FIG. 6 is a figure showing a record format of the figure data 10.

FIG. 7 is a figure showing a record format of the data 61 for extraction.

FIG. 8 is a figure showing a record of the data 71 indicating that no further update is occurred.

FIG. 13 is a figure showing a record of the data representing FIG. 11.

FIG. 14 is a figure showing a record of the data representing FIG. 12.

FIG. 15 is a figure showing a record of the data representing FIG. 12.

FIG. 27 is a figure showing a record format of the figure data 10.

FIG. 28 is a figure showing a record of data 61 for extraction.

FIG. 29 is a figure showing a record of the update range data 11.

FIG. 30 is a figure showing a record of the data 72 indicating that no further update is occurred.

FIG. 35 is a figure showing a record of the data representing FIG. 33.

FIG. 36 is a figure showing a record of the data representing FIG. 34.

FIG. 37 is a figure showing a record of the data representing FIG. 34.

FIG. 47 is a figure showing a hardware configuration of a distributed type figure data transmitting system.

FIG. 48 is a figure showing a hardware configuration of a distributed type figure data transmitting system.

BEST MODE FOR CARRYING OUT THE INVENTION

Figure 1:
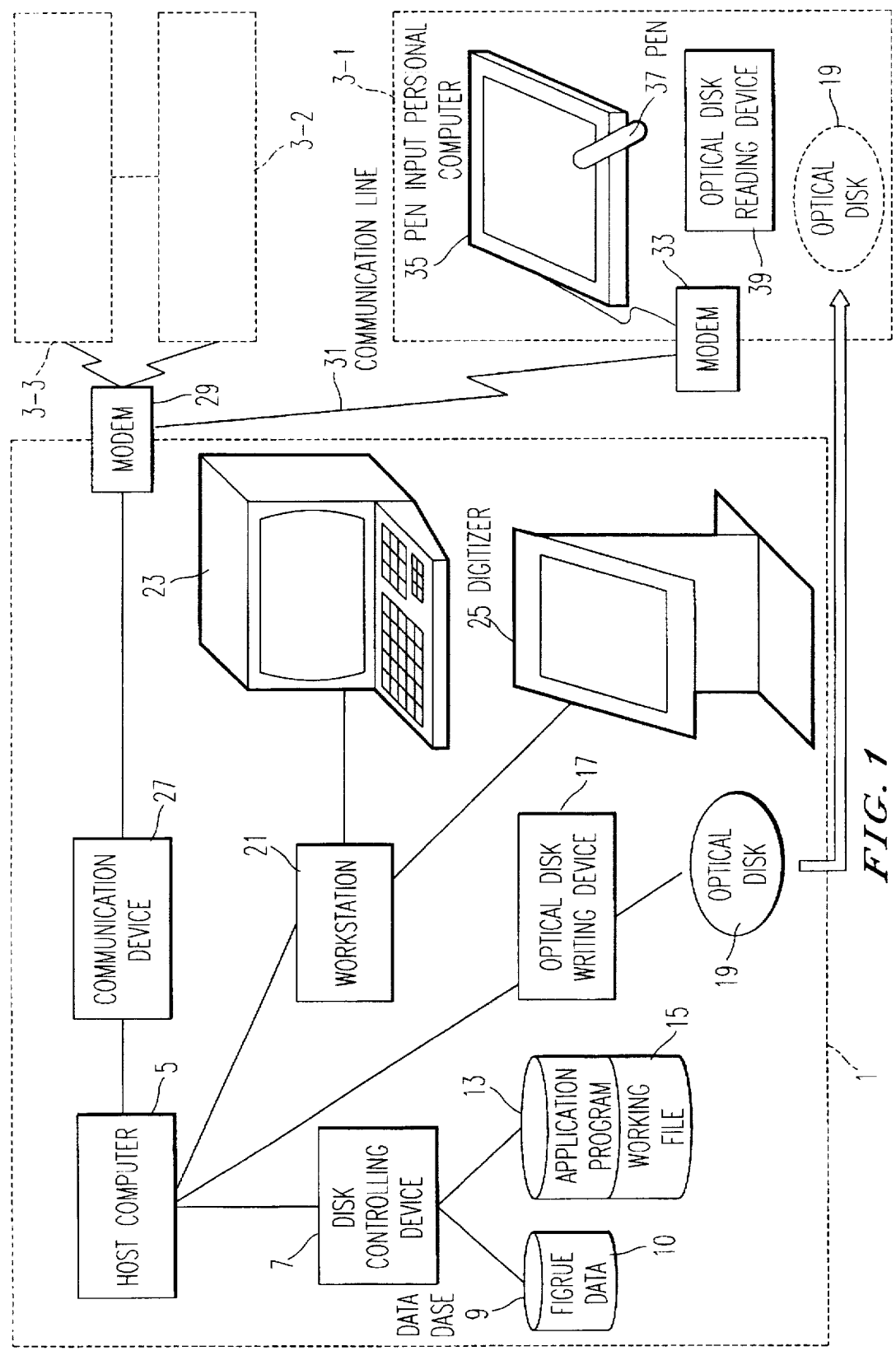
FIG. 1 is a figure showing a hardware configuration of the figure data transmitting system according to the first embodiment.

Preferred embodiments of the present invention will be explained in detail with reference to the drawings. FIG. 1 is a figure showing a hardware configuration of a figure data transmitting system according to the first embodiment. In FIG. 1, reference numeral 1 denotes a parent station, 3-1, 3-2, 3-3, . . . denote a child station, 5 denotes a host computer, 7 denotes a disk controlling device.

The data base 9 stores the figure data 10 including geographical data such as roads, and facility data such as gas pipes. The application program 13 performs retrieving and update processing as indicated in this embodiment on the host computer 5. In retrieving and update processing, the necessary data is read out to the working file 15 and is subjected to the processing. The optical disk writing device 17 writes the figure data 10 stored in the data base 9 into the optical disk 19. The reference numeral 21 denotes a workstation, 23 denotes a terminal device. The digitizer 25 is used for correcting the figure data when locations of gas pipes are changed under a gas construction work, for example. The host computer 5 is connected to the child stations 3-1, 3-2, 3-3, . . . via the communication device 27, the modem 29 provided in the parent station, and the communication line 31.

The child station 3-1 includes the modem 33 provided at the child station, the personal computer 35 with a pen input function, and the optical disk reading apparatus 39. The personal computer 35 is used mainly for specifying a range to be retrieved. The optical disk reading device 39 reads the contents of the optical disk 19 which was made every predetermined period of time by using the optical disk writing device 17 e.g., once a year and was sent to the child station 3-1. The child stations 3-2, 3-3, . . . has the same configuration as the child station 3-1.

Figure 9:
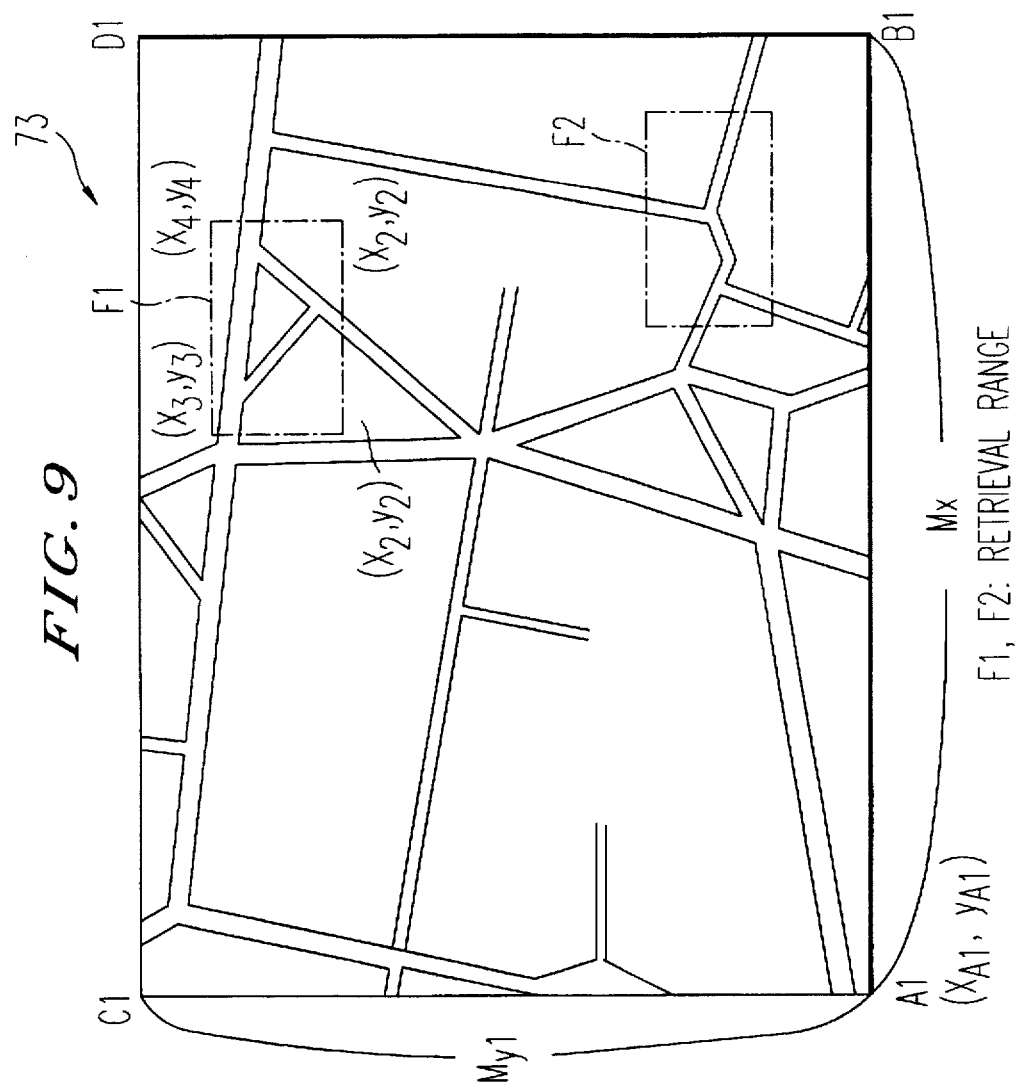
FIG. 9 is a figure showing a map which is not updated.
Figure 10:
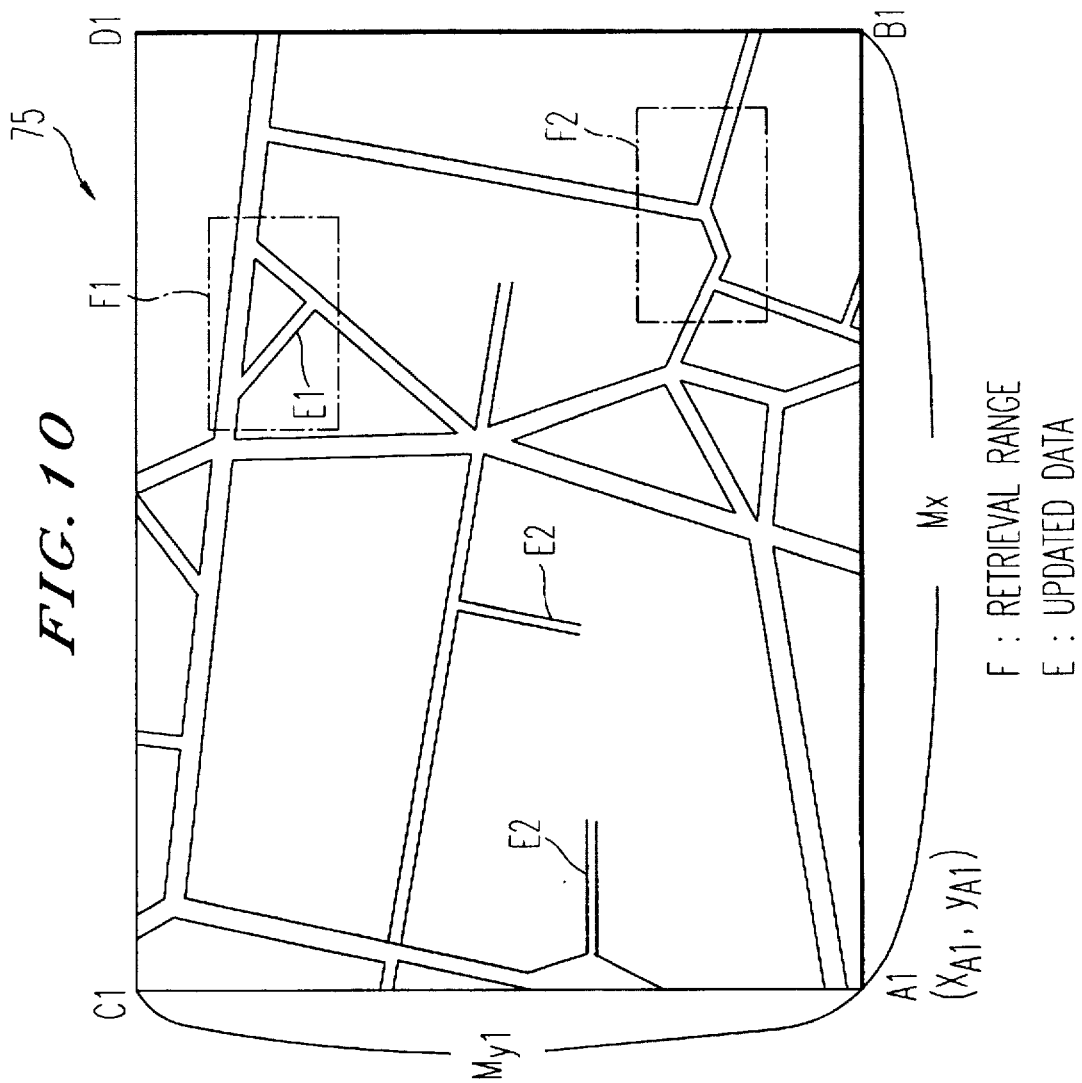
FIG. 10 is a figure showing an updated map.

A case will be explained exemplarily below where the geographical data shown in FIG. 9 is updated to the one shown in FIG. 10.

Figure 2:
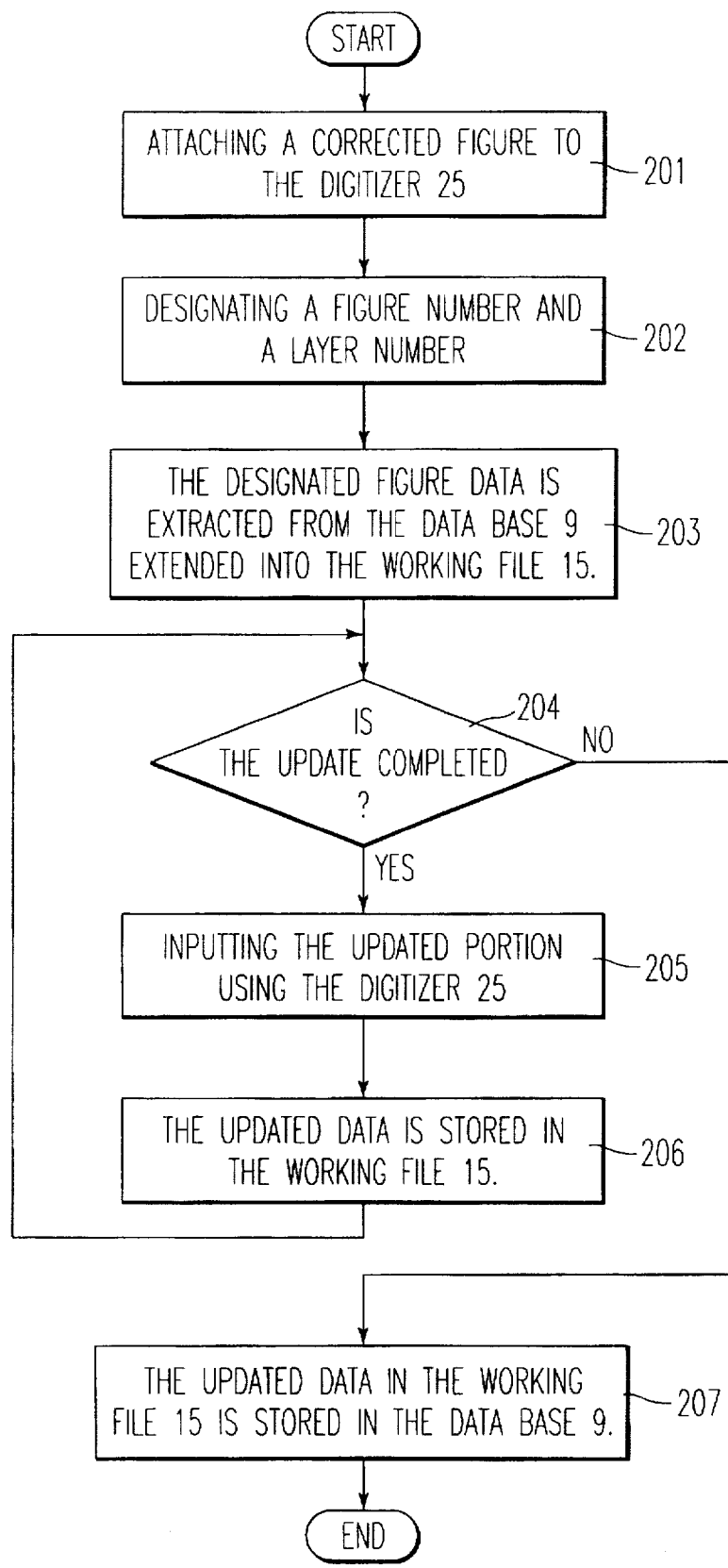
FIG. 2 is a flowchart showing procedures of updating data at a parent station.

At first, the process for updating data at the parent station 1 will be explained according to the flowchart of FIG. 2. An operator attaches a corrected figure to the digitizer 25 (step 201) and inputs a figure number and a layer number to be corrected, using the keyboard of the terminal device 23 (step 202). In this embodiment, layer numbers are numbers attached to the geographical data, facility data and so forth. The application program 13 extracts the figure data corresponding to the inputted figure number and the inputted layer number from the data base 9 and extends the data in the working file 15 (step 203).

FIG. 6 is a figure showing a record format of the figure data 10 stored in the data base 9. The figure data 10 includes the layer number 52, record number 53, date and/or time of updating 54, the figure range 55, the number of data 57 and the coordinate data 59. As the layer number 52, the number of a layer where a record exists is stored and as the record number 53, the number peculiar to each record is stored. As the update date and/or time 54, the latest date and/or time at the time when the figure data record 51 is updated is stored. As the figure range 55, the maximum values and the minimum values on the X-coordinate values and Y-coordinate values in the coordinate values 59 are stored. As the number of data 57, a number N of the coordinate data is stored. As the coordinate data 59, X-coordinate values and Y-coordinate values which make a figure are stored.

An operator inputs the updated part from the corrected figure placed on the digitizer 25 (step 205) until all of the updating procedures are finished (step 204) and the updated data is stored in the working file 15 (step 206). When a road extension construction work is performed for example, an operator inputs the position of the boundary of a new road and the corresponding data is stored in the working file 15.

After completion of inputting the updated part (step 204), the application program 13 stores updated data in the working file 15 into the data base 9 (step 207).

Figure 3:
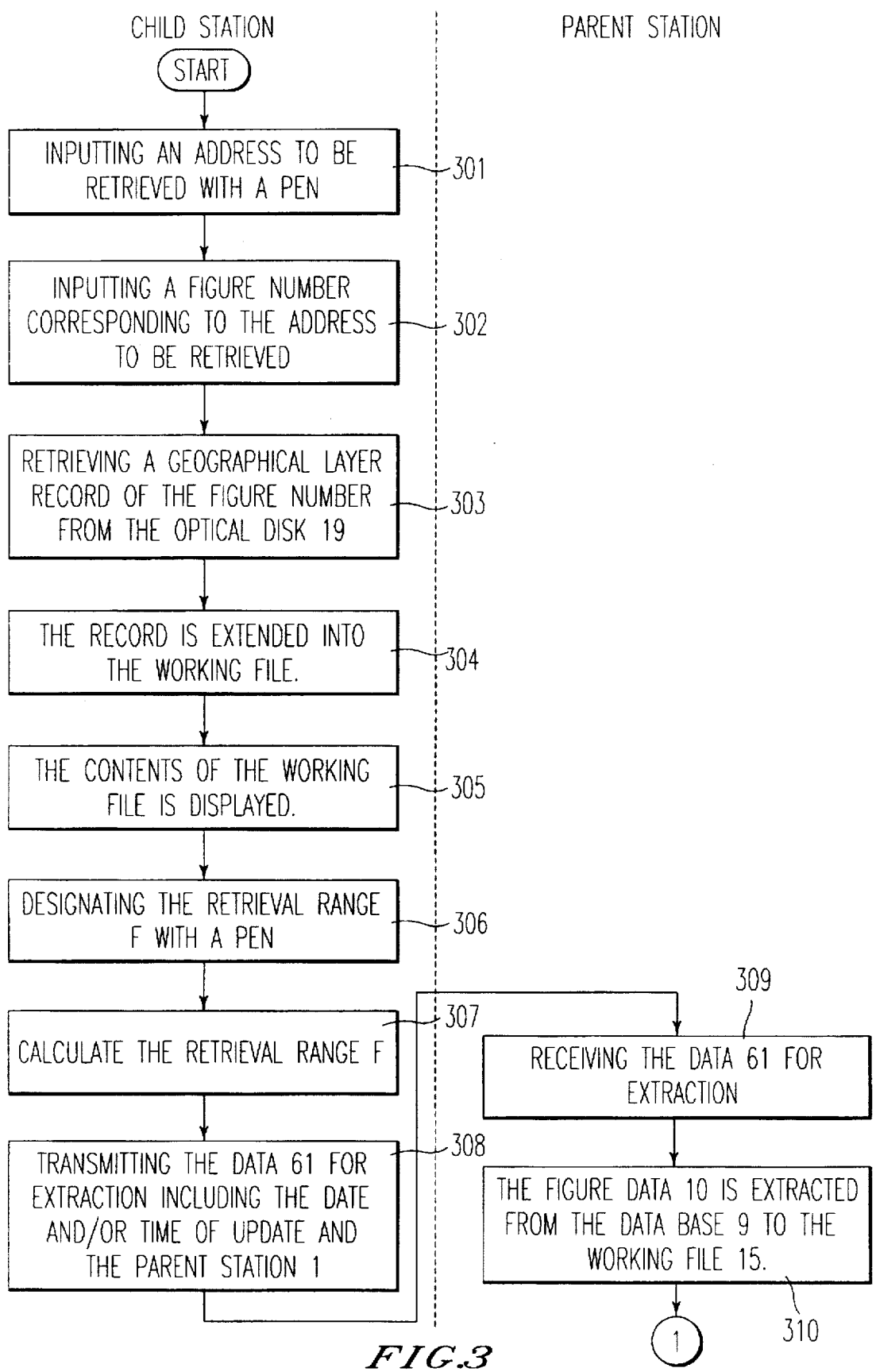
FIG. 3 is a flowchart showing procedures of a communication between a child station and a parent station.
Figure 4:
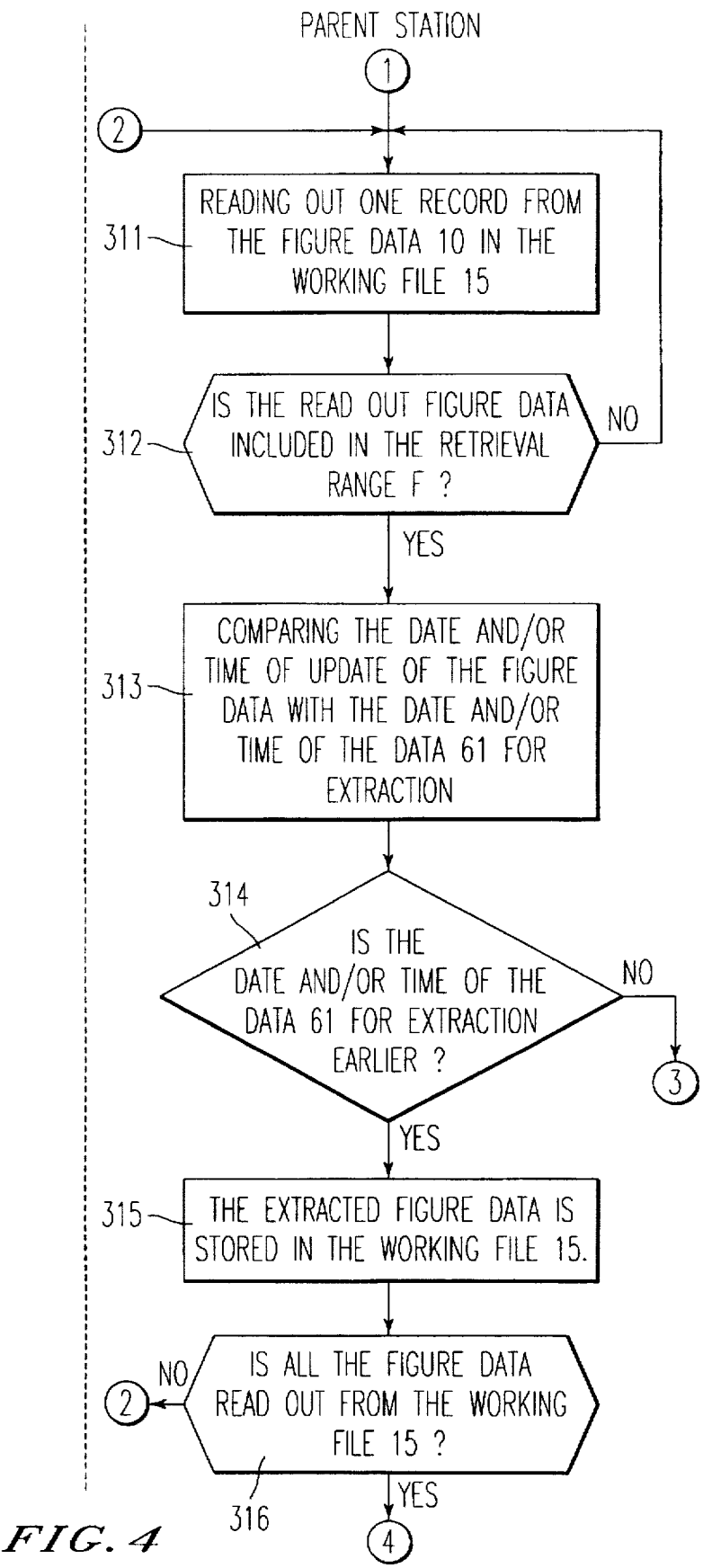
FIG. 4 is a flowchart showing procedures of a communication between a child station and a parent station.
Figure 5:
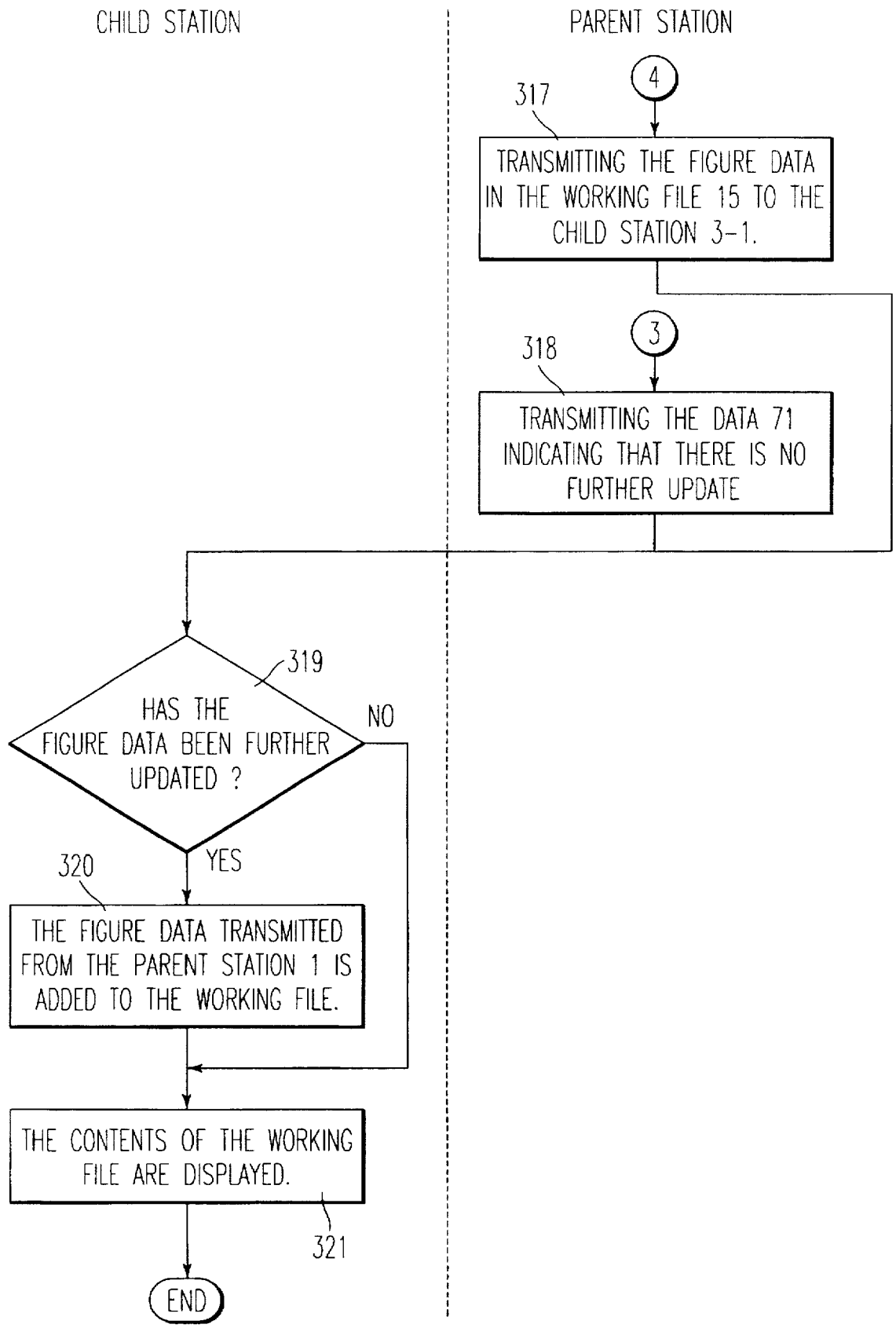
FIG. 5 is a flowchart showing procedures of a communication between a child station and a parent station.

Next, the communication between the parent station and a child station will be explained in accordance with the flowcharts of FIGS. 3, 4 and 5. An operator inputs an address to be retrieved using the pen input personal computer 35 at a child station (step 301) and also inputs a figure number corresponding to the address to be retrieved (step 302). The pen input personal computer 35 retrieves geographical layer record of the inputted figure number from the optical disk 19 (step 303) and extracts it to the working file of the pen input personal computer 35 (step 304). Then, the pen input personal computer 35 displays the contents of the working file (step 305).

Therefore, in this case, only the geographical data is displayed on the pen input personal computer 35 and the facility data such as a gas pipe is not displayed on the computer 35. An operator specifies retrieval range F on the screen with the pen 37 (step 306). The pen input personal computer 35 converts the retrieval range F specified with the pen 37 into four coordinate values (step 307). An operator also specifies the layer to be updated. The pen input personal computer 35 produces the data 61 for extraction including update date and/or time and retrieval range F, and the computer 35 transmits the data 61 to the parent station 1 (step 308).

FIG. 9 is a figure showing display contents at a child station in the above state. The retrieval ranges F1, F2 are specified on the map 73 with the pen 37.

Taking the range F1 as an example, coordinate values of the four points (X1, Y1), (X2, Y2), (X3, Y3) and (X4, Y4) are stored in the retrieval range 69 of the data 61 for extraction.

FIG. 7 is a figure showing a record format of the data 61 for extraction. The data 61 for extraction consists of the figure number 63, the layer A 65, the layer B 67, . . . the retrieval range 69. A number of figure which includes the retrieval range F is stored in the figure number 63. The layer A 65 and the layer B 67 include a type of a layer and date and/or time at a time when the data is updated. For example, the data "Nov. 23, 1993" is stored in the layer A 65 as a date at a time when the data is updated. The coordinate values of the four points representing the retrieval range F specified by the pen 37 are stored in the retrieval range 69.

When the data 61 for extraction transmitted from a child station is received at the parent station 1 (step 309), the application program 13 extracts the figure data corresponding to the figure number 63 of the data 61 for extraction from the data base 9 into the working file 15 (step 310).

Then, the figure data 10 stored in the working file 15 is read out record by record (step 311) and it is judged whether the read-out figure data 10 is included in the retrieval range F or not (step 312). If the read-out figure data 10 is included in the retrieval range F, the date and/or time 54 of the update of the extracted figure data is compared with the update date and/or time of the date 61 for extraction, for example "Nov. 23, 1993" (step 313).

When the update date and/or time of the data 61 for extraction is earlier than that of the extracted figure data (step 314), the extracted figure data is stored in the working file 15 as a transmission data (step 315) and the processes from steps 311 to 315 are repeated until all of the figure data is extracted (step 316).

When all of the figure data corresponding to the figure number of the data 61 for extraction is read out from the data base 9, the figure data stored in the working file 15 as transmission data is transmitted to the child station 3-1 (step 317).

When update date and/or time of the data 61 for extraction is not earlier, the data 71 indicating that no further update has occurred is transmitted to a child station (step 318). FIG. 8 is a figure showing a record of the data 71 indicating that the figure data has not been further updated.

It is judged at a child station whether the figure data has been further updated or not (step 319). If the figure data has further been updated, the figure data sent from the parent station 1 is added to the working file of the pen input personal computer 35 (step 320) and the contents of the working file of the personal computer 35 is displayed (step 321).

Figure 11:
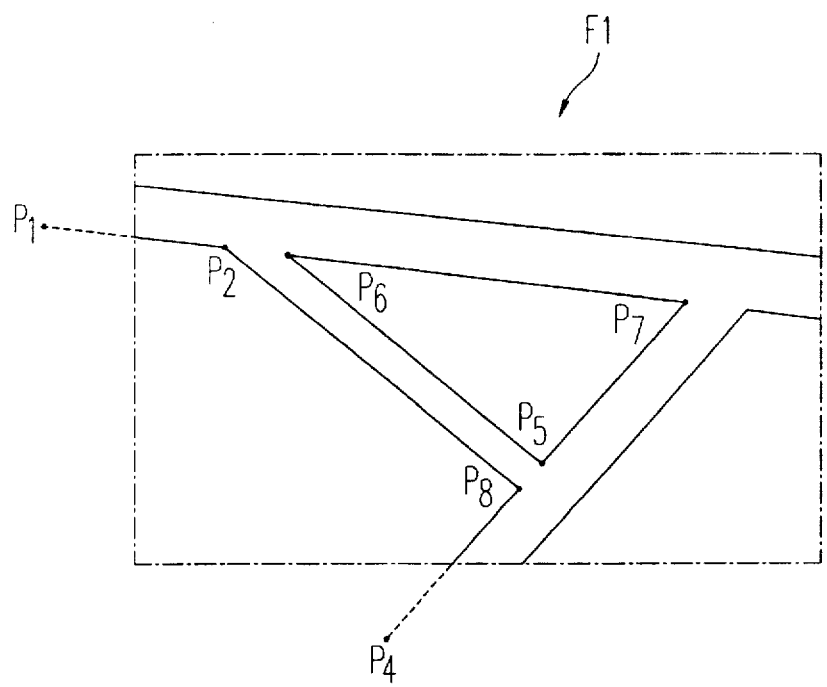
FIG. 11 is an enlarged figure of the portion F1 shown in FIG. 9.
Figure 12:
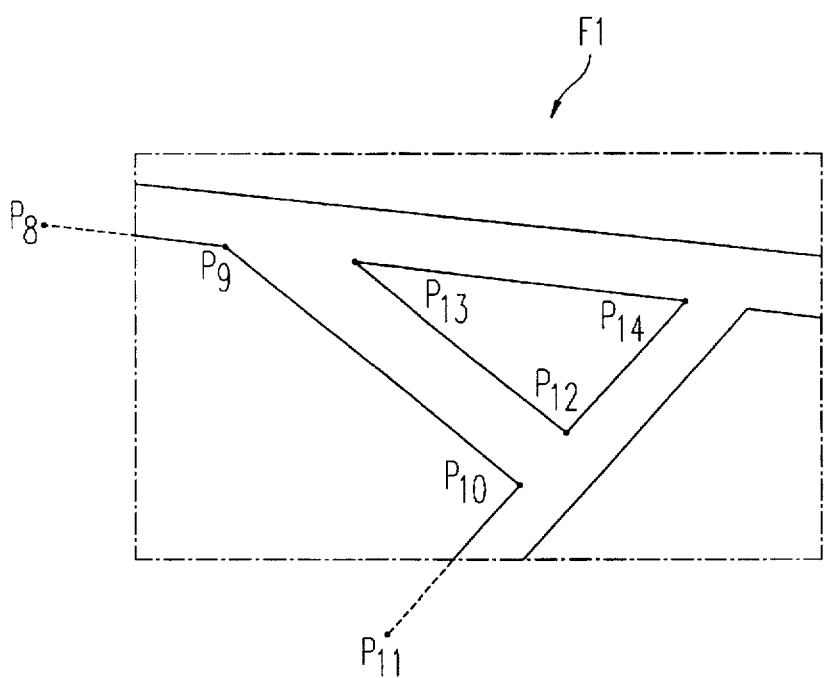
FIG. 12 is an enlarged figure of the portion F1 shown in FIG. 10.
Figure 16:
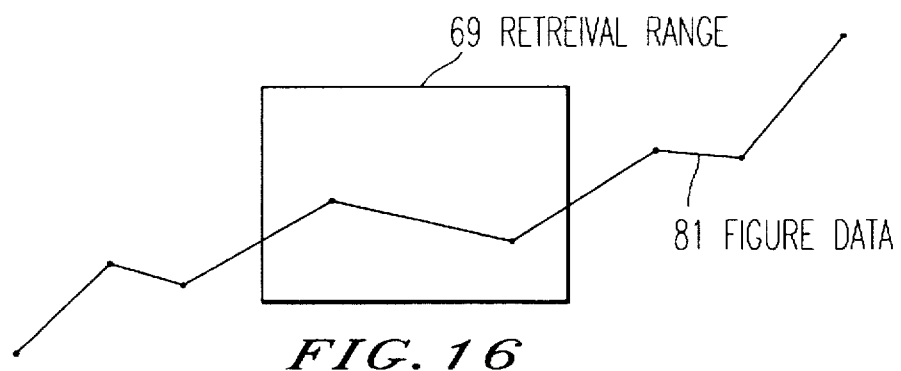
FIG. 16 is a figure showing a relationship between the retrieval range 69 and the figure data 81 to be transmitted.

If the figure data has not further been updated (step 319), the contents extracted to the working file of the pen input personal computer 35 from the optical disk 19 at a child station are displayed (step 321). FIG. 10 is a figure showing a geographical data including an updated portion at a parent station. Comparing FIG. 10 with FIG. 9, the portions E1, E2 and E3 are updated. FIG. 11 is a figure enlarging the portion F1 of FIG. 9. FIG. 12 is a figure enlarging the portion F of FIG. 10. FIG. 13 is a figure showing a record of the figure data representing FIG. 11. The data "–1" which indicates a solid line, the data "–16" which indicates a jump procedure, or the data "–999" which indicates an end of procedure is stored in the line type flags 86-1, 86-2 and 86-3. FIG. 14 is a figure showing a record of the figure data representing FIG. 12.

Namely, FIG. 13 shows a record of geographical data within the retrieval range F1 when the retrieval range F1 is specified at a child station and FIG. 14 shows a record at a child station in a case where the updated geographical data sent from the parent station is displayed at a child station. In this case, the record indicated at FIG. 13 is deleted and the record indicated at FIG. 14 is displayed thereafter.

Further, as indicated in FIG. 15, there is another way in which the record is added without deleting records. When the value "–512" representing line shading procedure is stored in the line type flag 89-1, the data indicated at FIG. 13 is displayed on a display screen in the same color as that of the background. On the other hand, when the value "–1" representing a solid line is stored in the line type flag 89-3, only the data indicated in FIG. 14 is displayed on a screen as shown in FIG. 12.

Figure 17:
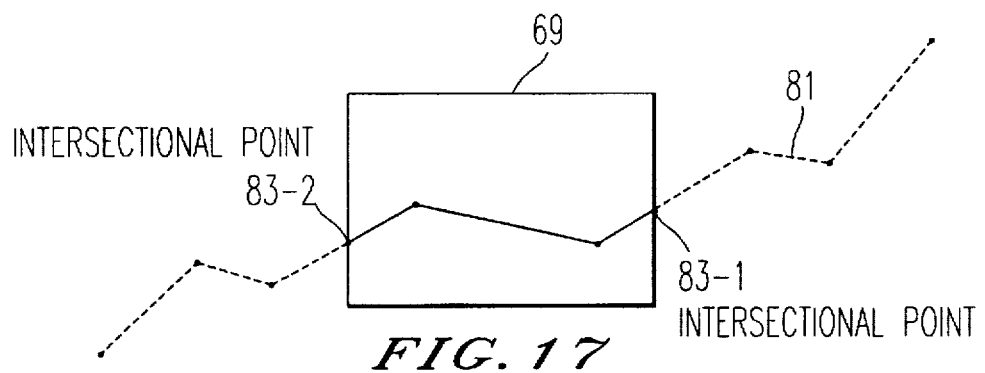
FIG. 17 is a figure showing a relationship between the retrieval range 69 and the figure data 81 to be transmitted.
Figure 18:
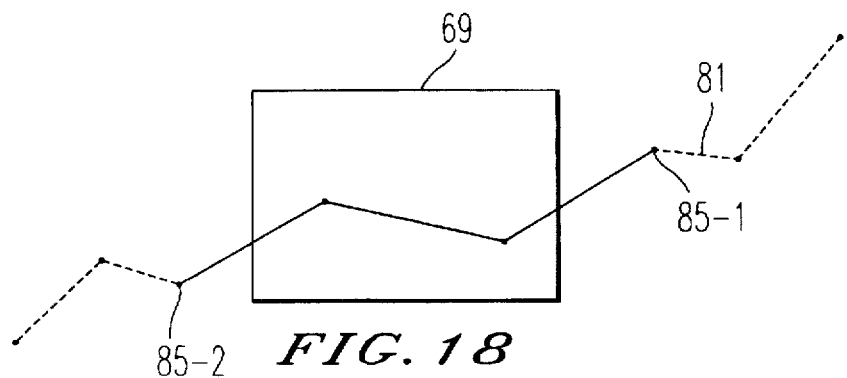
FIG. 18 is a figure showing a relationship between the retrieval range 69 and the figure data 81 to be transmitted.

In the above explained embodiment, although all of the figure data 81 including the retrieval range 69 is transmitted from the parent station 1 to a child station as it is (Japanese Patent Application Laid-Open No. 108729/93), only the portion concerning the retrieval range 69 out of the figure data 81 may be transmitted by finding the intersectional points 83-1 and 83-2 of the frame of the retrieval range 69 and the figure data 81 as shown in FIG. 17 (Japanese Patent Application No. 72953/92).

Further, the minimum portion represented by the coordinate points 85-1 to 85-2 of the figure data, which are included in the retrieval range 69 may be transmitted (Japanese Patent Application No. 112775/93).

Figure 19:
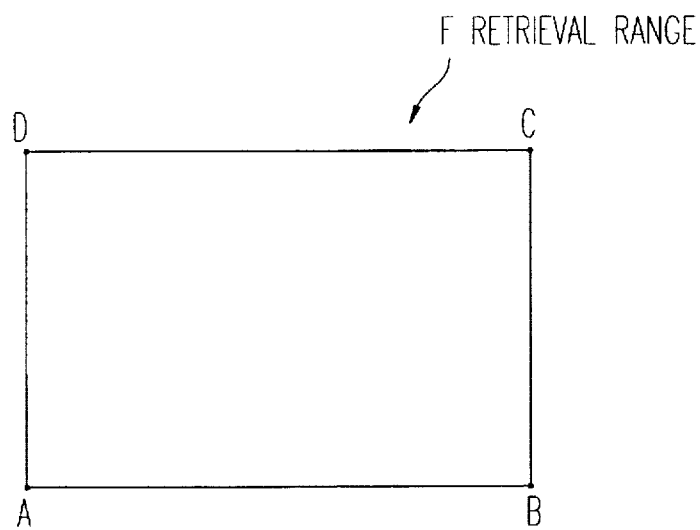
FIG. 19 is a figure showing the retrieval range F.
Figure 20:
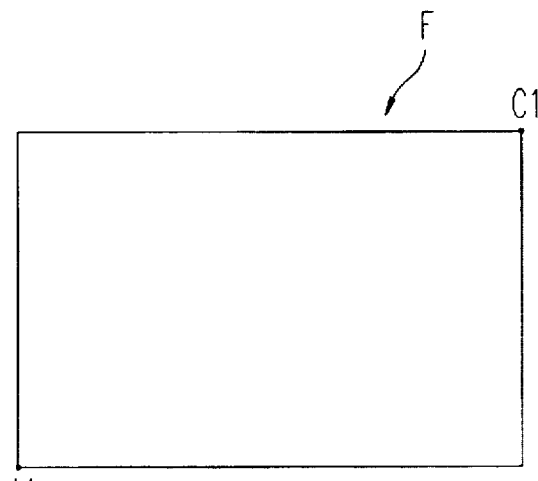
FIG. 20 is a figure showing the retrieval range F.
Figure 21:
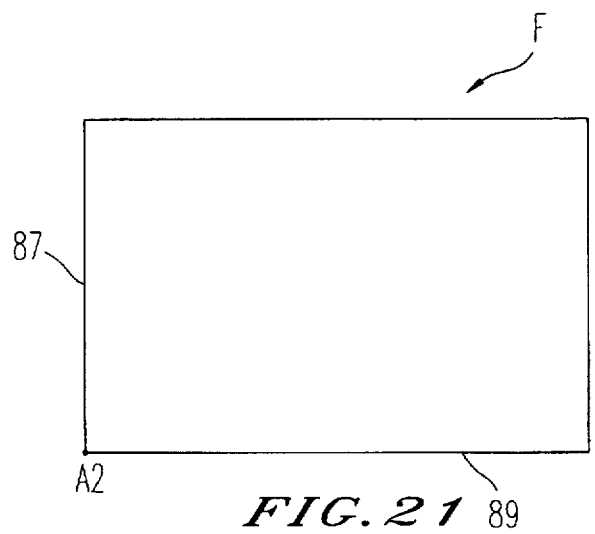
FIG. 21 is a figure showing the retrieval range F.

Furthermore, in the above embodiment, although rectangular retrieval range F is represented by the values of the coordinate points A, B, C and D at the corners as shown in FIG. 19, the retrieval range may be represented by two points A1 and C1 on an orthogonal line, each of which has the maximum values or minimum values in the retrieval range F as shown in FIG. 20. Further, the retrieval range F may be represented by the lengths of two sides 87, 89 and the intersectional point of the two sides 87 and 89, i.e., the point A2 having the minimum values in the rectangular area as shown in FIG. 21.

Additionally, the present invention is widely used for geographical data and facility data such as gas pipes and water pipes.

As explained above, according to the above embodiment, updated figure data is transferred from the parent station to a child station, thereby the updated figure data may be used at a child station. In addition, only the minimum data is transmitted from the parent station to a child station with the result that the figure data is transmitted during a shorter time period.

Figure 22:
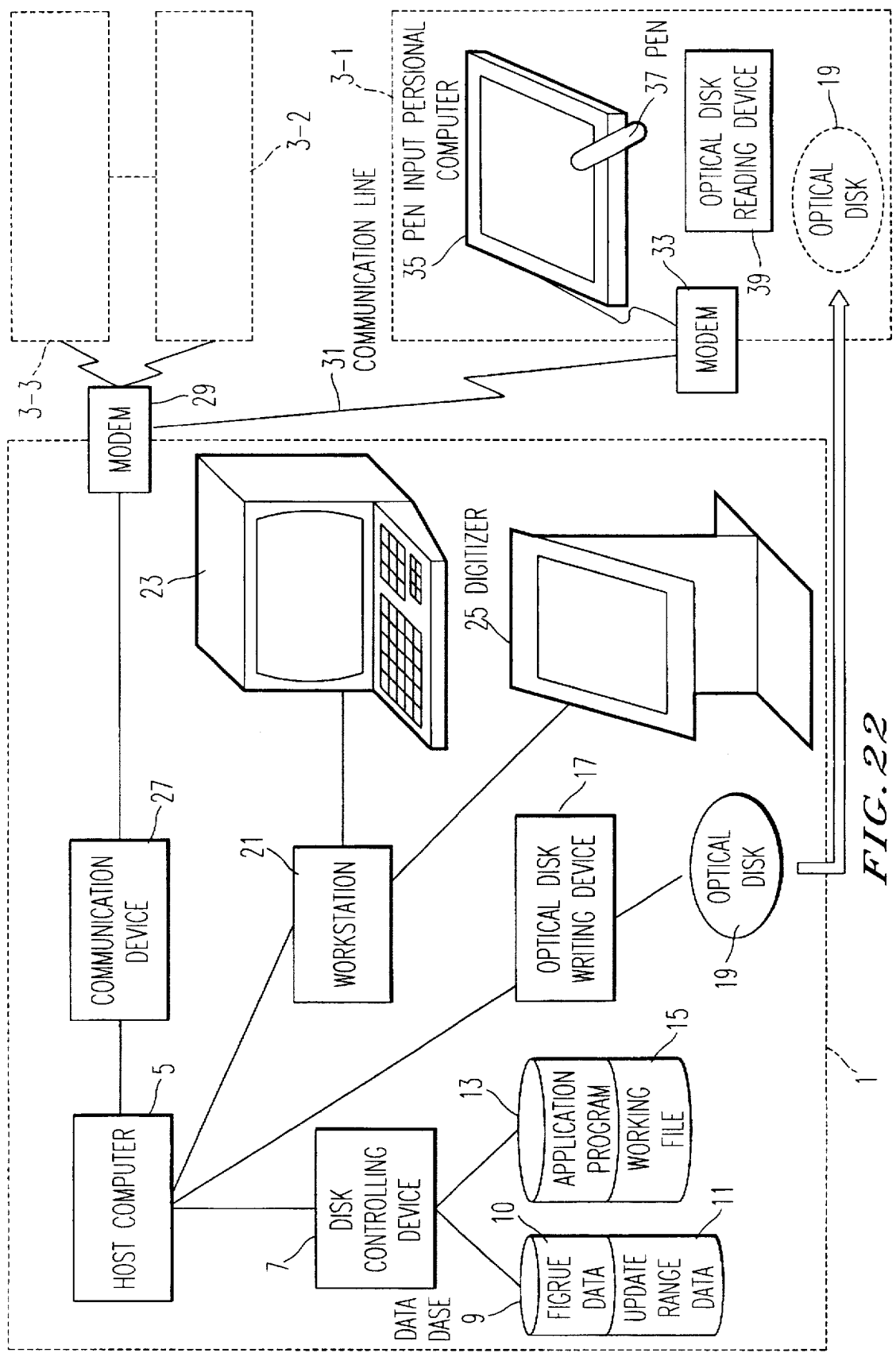
FIG. 22 is a figure showing a hardware configuration of the figure data transmitting system according to the second embodiment.

Next, the second embodiment will be explained in detail. FIG. 22 is a figure showing a configuration of hardware of the figure data transmitting system according to the second embodiment. In this figure data transmitting system, the data base 9 stores the update range data 11 indicating update range at a time when the figure data 10 is updated as well as the figure data 10 which consists of geographical data such as roads and facility data such as gas pipes.

Figure 31:
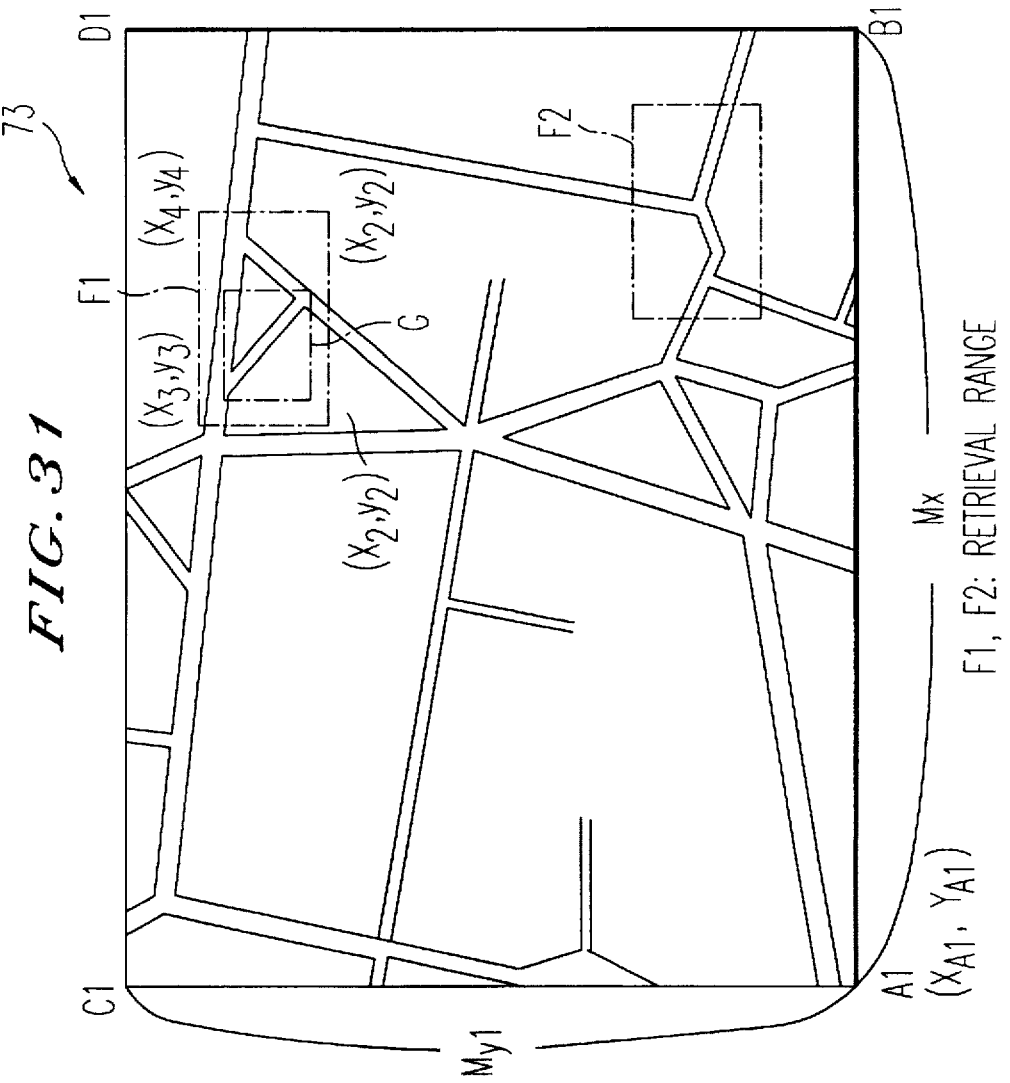
FIG. 31 is a figure showing a map which is not updated.

The case where the geographical data indicated in FIG. 31 is updated to that of FIG. 32 will be explained below as an example.

Figure 23:
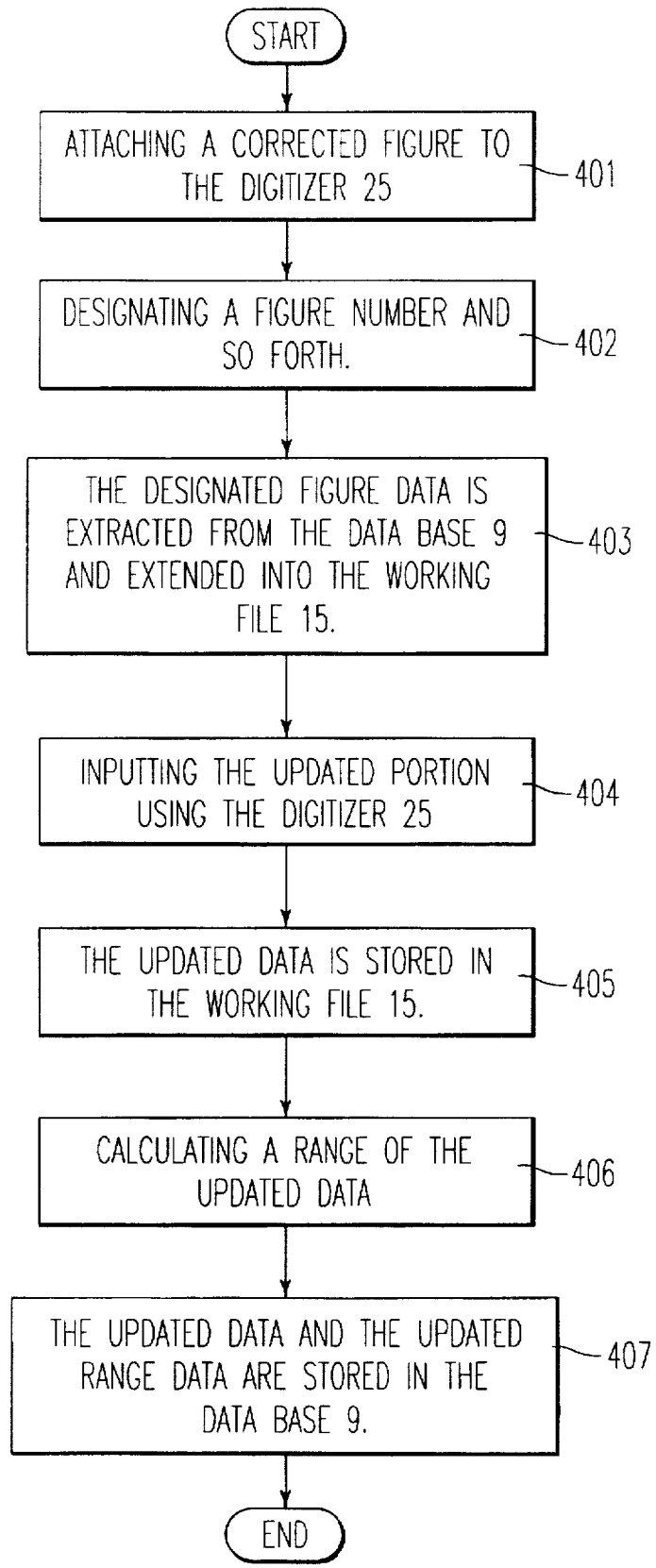
FIG. 23 is a flowchart showing procedures of updating data at a parent station.

At first, the updating process of the data at the parent station 1 will be explained according to the flowchart of FIG. 23. An operator attaches a corrected figure to the digitizer 25 (step 401) and inputs a figure number and a layer number for the figure to be corrected (step 402). A layer number is a number attached to each of geographical data, facility data and so forth. The application program 13 extracts the figure data corresponding to the inputted figure number and the inputted layer number from the data base 9 and extends the data into the working file 15 (step 403).

FIG. 27 is a figure showing a record format of the figure data 10 stored in the data base 9. The figure data 10 includes the layer number 52, record number 53, date and/or time of updating 54, the figure range 55, the number of data 57 and the coordinate data 59. As the layer number 52, the number of a layer where a record exists is stored and as the record number 53, the number inherent to each record is stored. As the update date and/or time 54, the latest date and/or time at the time when the figure data 10 is updated is stored. As the figure range 55, the maximum values and the minimum values on the X-coordinate and Y-coordinate in the coordinate data 59 are stored. As the number of data 57, a number N of the coordinate data 59 is stored. As the coordinate data 59, X-coordinate values and Y-coordinate values which make a figure are stored.

An operator inputs the updated portion from the corrected figure placed on the digitizer 25 (step 404) and the updated data is stored in the working file 15 (step 405). When a road extension construction work is performed for example, an operator inputs the position of the boundary of a new road and the corresponding data is stored in the working file 15. The application program 13 calculates an update range from the inputted updated data (step 406). The application program 13 stores the updated figure data and the update range data 11 into the separate regions of the data base 9 respectively (step 407).

FIG. 29 is a figure showing a record format of the update range data 11 which is to be stored in data base 9. The update range data 11 includes the layer number 70a, the record number 70b, update date and/or time 70c and the update range 71 represented by minimum values and maximum values of X-coordinate and Y-coordinate.

Figure 32:
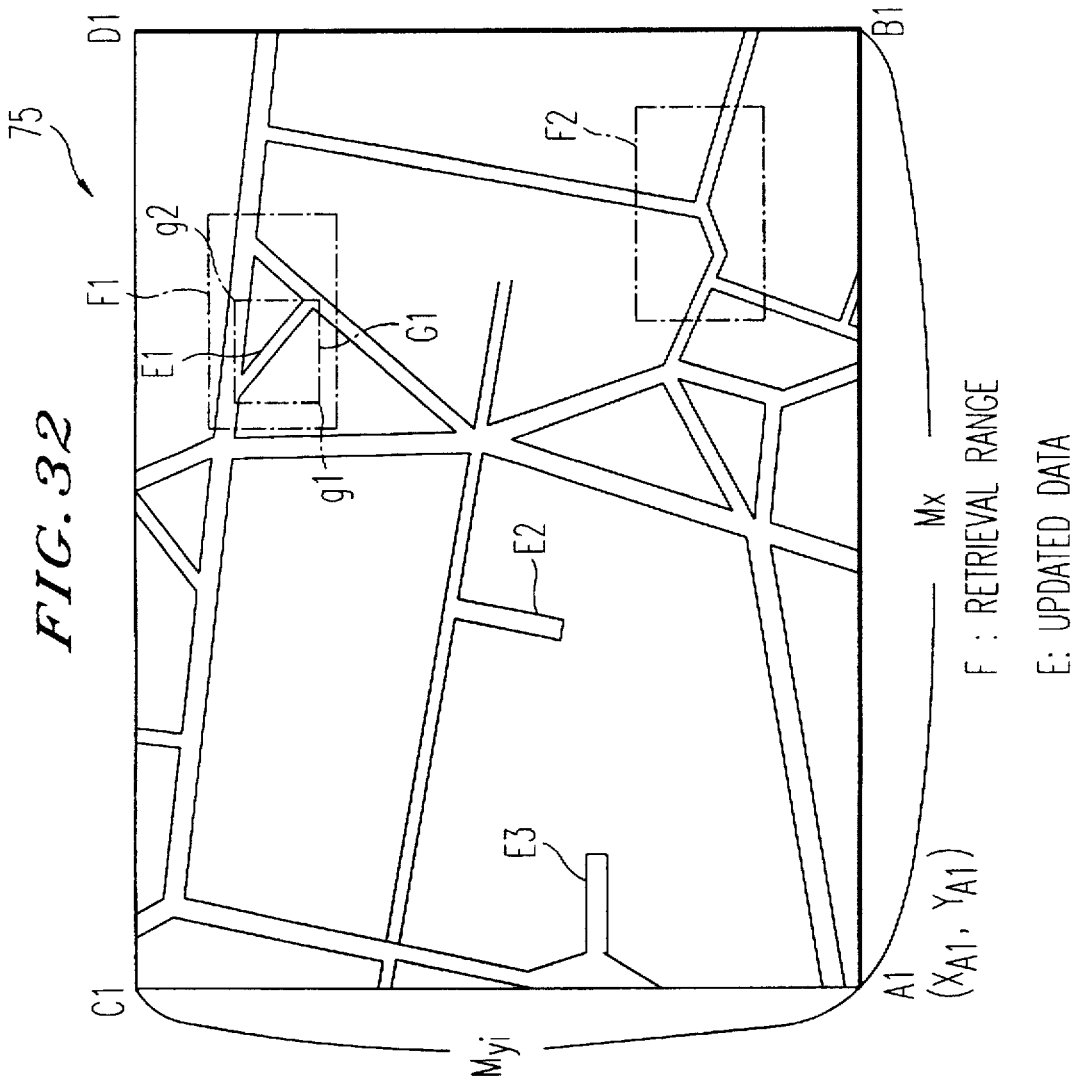
FIG. 32 is a figure showing an updated map.

For example, when the geographical data of FIG. 31 is updated to the data indicated in FIG. 32, coordinate values of the vertices g1 (Xmin, Ymin) and g2 (Xmax, Ymax) of the rectangular region indicating the update range G1 are stored in the update range 71.

Figure 24:
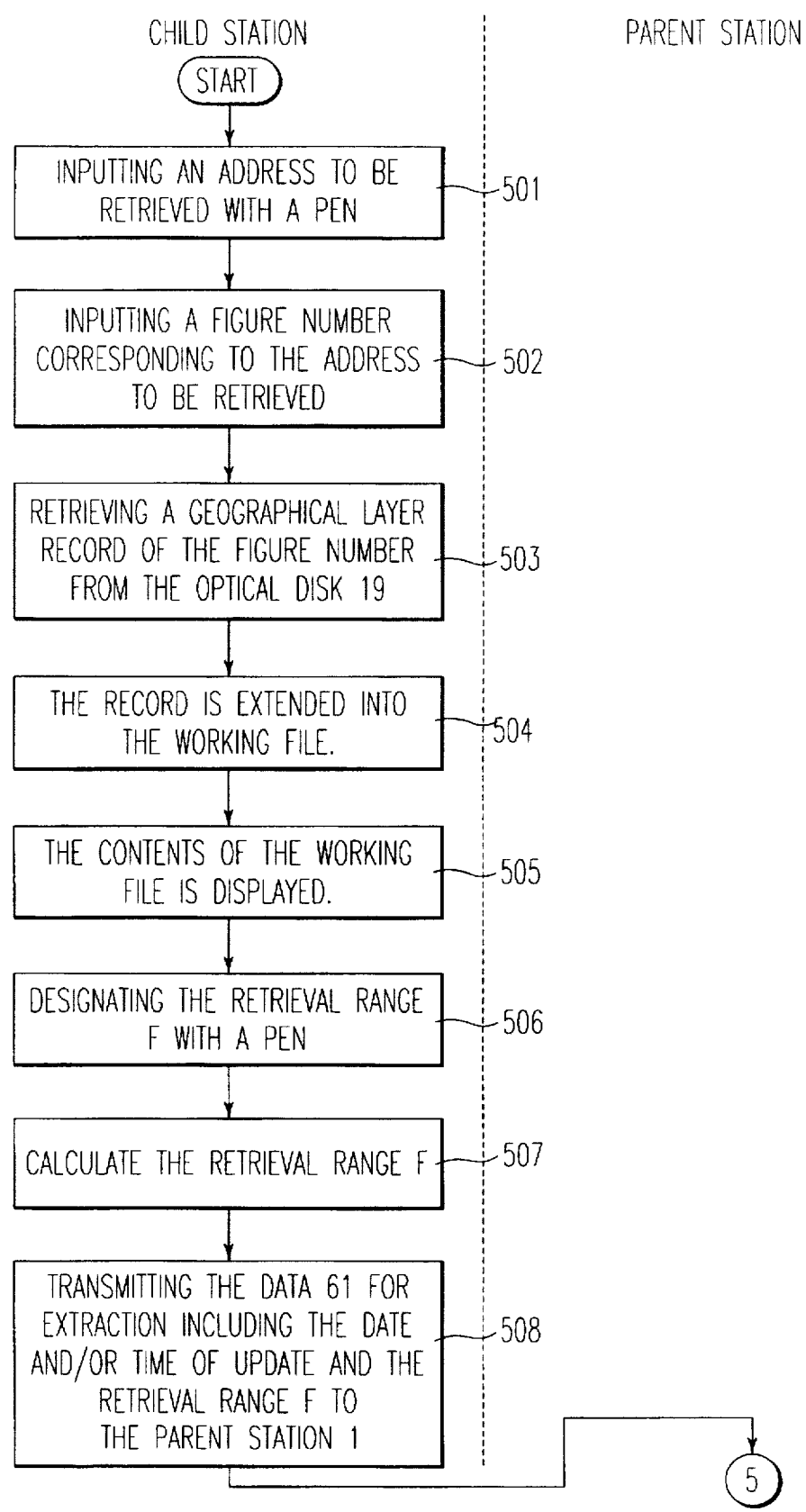
FIG. 24 is a flowchart showing procedures of a communication between a child station and a parent station.
Figure 25:
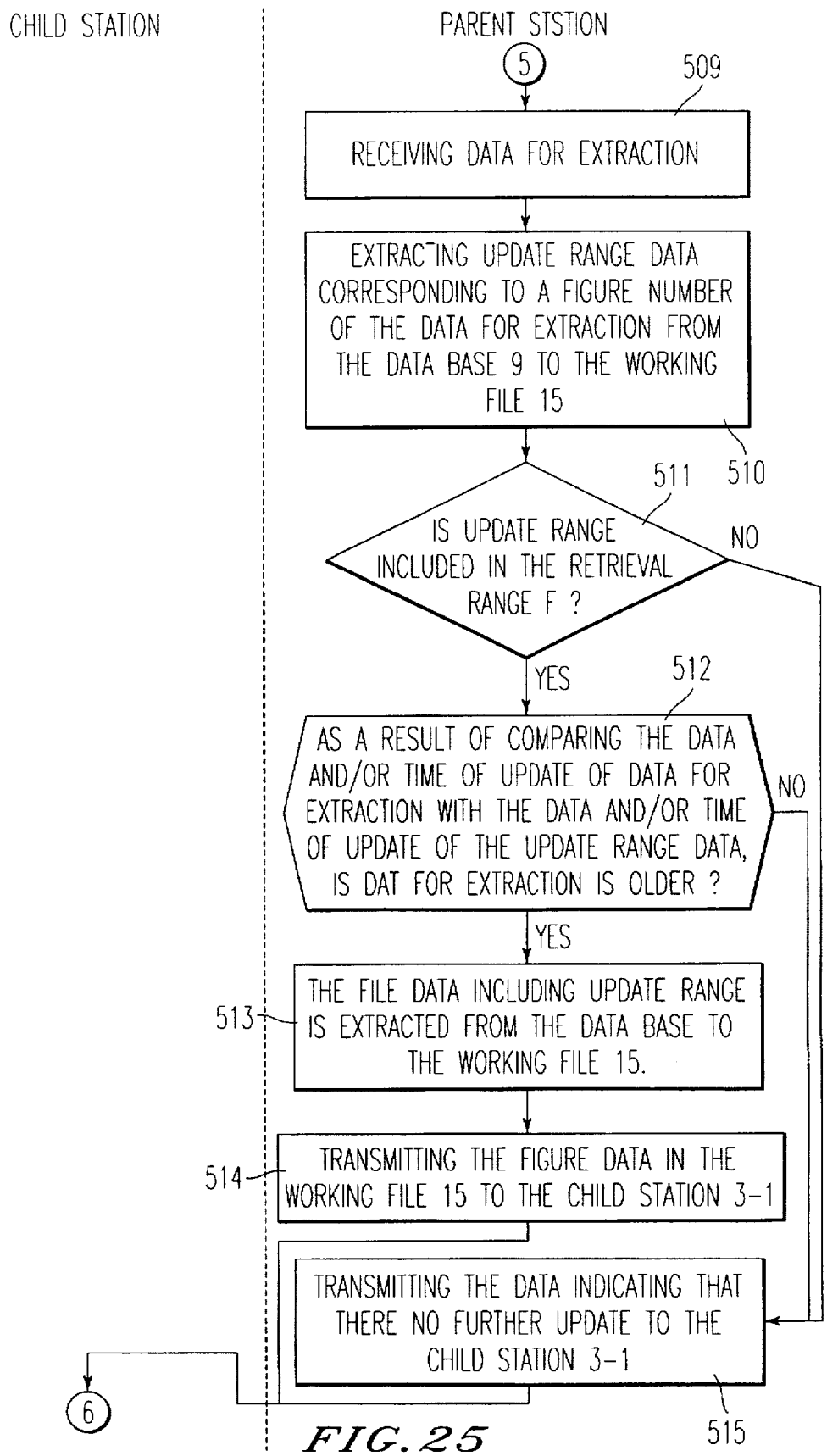
FIG. 25 is a flowchart showing procedures of a communication between a child station and a parent station.
Figure 26:
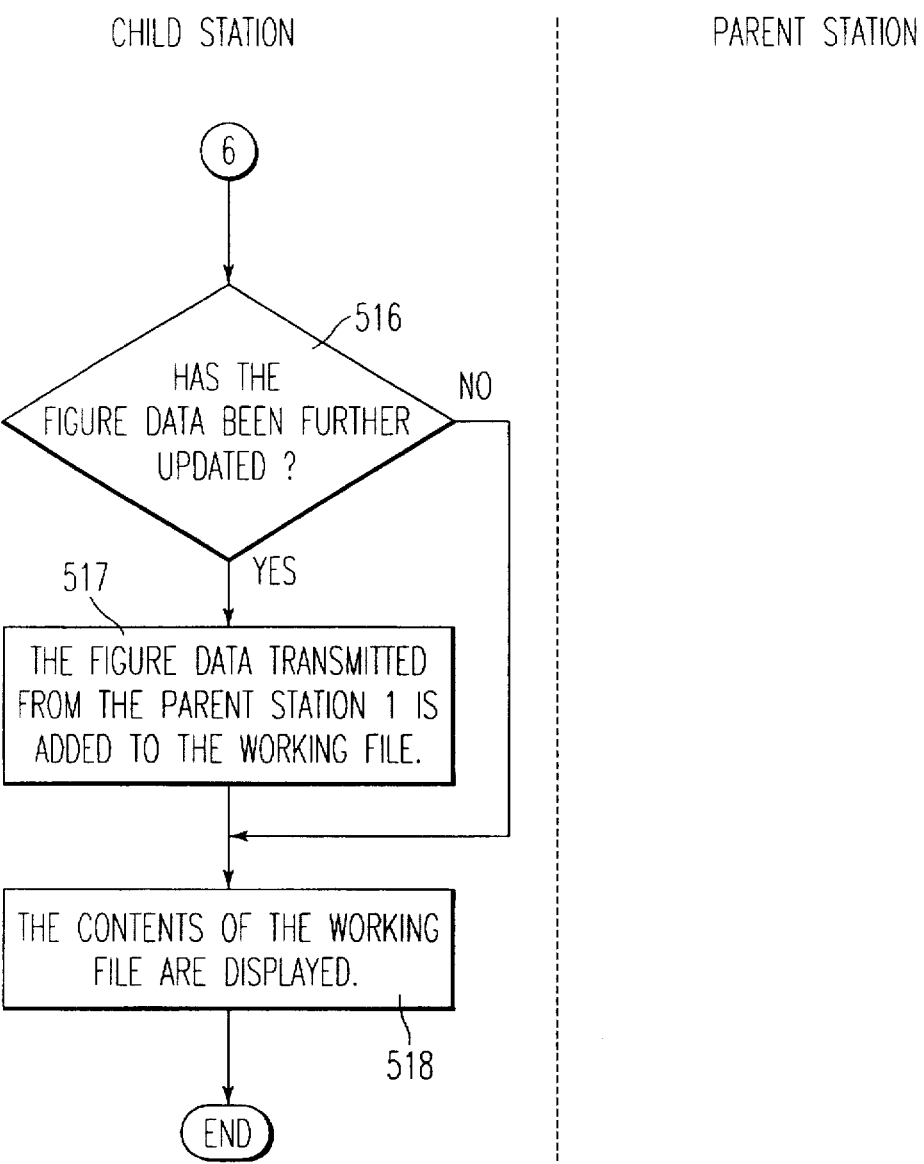
FIG. 26 is a flowchart showing procedures of a communication between a child station and a parent station.

Next, the communication between a child station and the parent station will be explained according to the flowcharts of FIGS. 24, 25 and 26. The address to be retrieved is inputted from the pen input personal computer 35 at a child station (step 501), and a figure number corresponding to the address to be retrieved is specified (step 502). The pen input personal computer 35 retrieves a geographical layer record of the specified figure number from the optical disk 19 (step 503), the geographical layer record is extracted into the working file of the pen input personal computer 35 (step 504), and the contents of the working file is displayed (step 505).

Accordingly, in this case, only the geographical data is displayed and the facility data such as gas pipes is not displayed. An operator specifies a retrieval range F on a screen with the pen 37 (step 506). The pen input personal computer 35 converts the retrieval range F into four coordinate values (step 507). An operator also specifies the layer to be updated. The pen input personal computer 35 produces the data 61 for extraction including update date and/or time and retrieval range F, and the computer 35 transmits the data 61 for extraction to the parent station 1 (step 508).

FIG. 31 is a figure showing display contents at a child station in the above state. The retrieval ranges F1, F2 are specified on the map 73 with the pen 31. Taking the range F1 as an example, coordinate values of the four points (X1, Y1), (X2, Y2), (X3, Y3) and (X4, Y4) are stored in the retrieval range 69 of the data 61 for extraction.

FIG. 28 is a figure showing a record format of the data 61 for extraction. The data 61 for extraction consists of the figure number 63, the layer A 65, the layer B 67, . . . the retrieval range 69. A number of figure which includes the retrieval range F is stored in the figure number 63. The layer A 65 and the layer B 67 include a type of a layer and date and/or time at a time when the data is updated. For example, the data "November 23, 1993" is stored in the layer A 65 as a date at a time when the data is updated. The coordinate values of the four points representing the retrieval range F specified with the pen 37 are stored in the retrieval range 69.

When the data 61 for extraction transmitted by a child station is received at the parent station 1 (step 509), the application program 13 extracts the update range data 11 corresponding to the figure number 63 of the data 61 for extraction from the data base 9 into the working file 15 (step 510). Whether the extracted update range data 11 is included in the retrieval range F or not is judged (step 511). If the data 11 is included in the retrieval range F, the date and/or time 70c of the update of the extracted update range data is compared with the update date and/or time of the data 61 for extraction, for example "Nov. 23, 1993" (step 512). When the update date and/or time of the data 61 for extraction is earlier than that of the extracted update range data, the figure data 10 within the update range and the update range data 11 from the figure data stored in the data base 9 are stored in the working file 15 as a transmission data (step 513). The figure data 10 and the update range data 11 stored in the working file 15 as a transmission data are transmitted to the child station 3-1 (step 514).

When the update range is not included in the retrieval range F or when update date and/or time of the data 61 for extraction is not earlier, the data 72 indicating that no further update has occurred is transmitted to a child station (step 515). FIG. 30 is a figure showing a record of the data 72 indicating that the figure data has not been further updated.

It is judged at a child station whether the figure data has been further updated or not (step 516). If the figure data has been updated, the figure data sent from the parent station 1 is added to the working file of the pen input personal computer 35 (step 517) and the contents of the working file of the personal computer 35 is displayed (step 518).

If the figure data has not further been updated (step 516), the contents extracted to the working file of the pen input personal computer 35 from the optical disk 19 at a child station are displayed (step 518). FIG. 32 is a figure showing a geographical data including an updated portion at a parent station.

Figure 33:
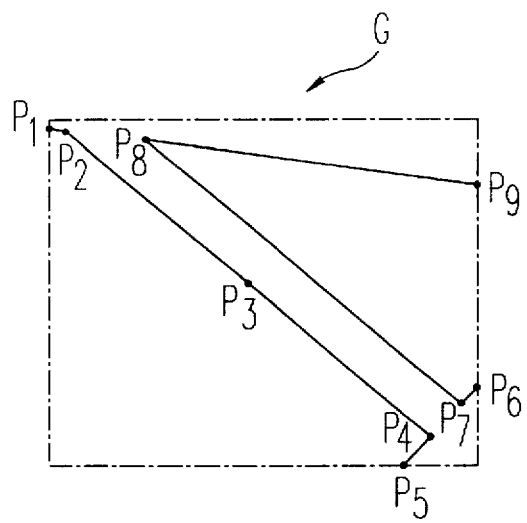
FIG. 33 is an enlarged figure of the portion G shown in FIG. 31.
Figure 34:
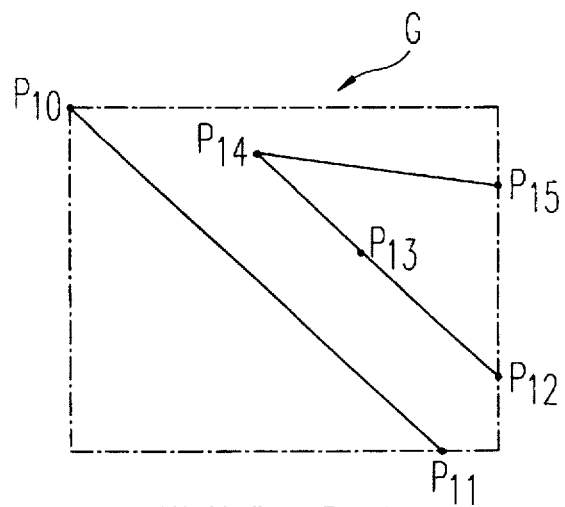
FIG. 34 is an enlarged figure of the portion G1 shown in FIG. 32.
Figure 38:
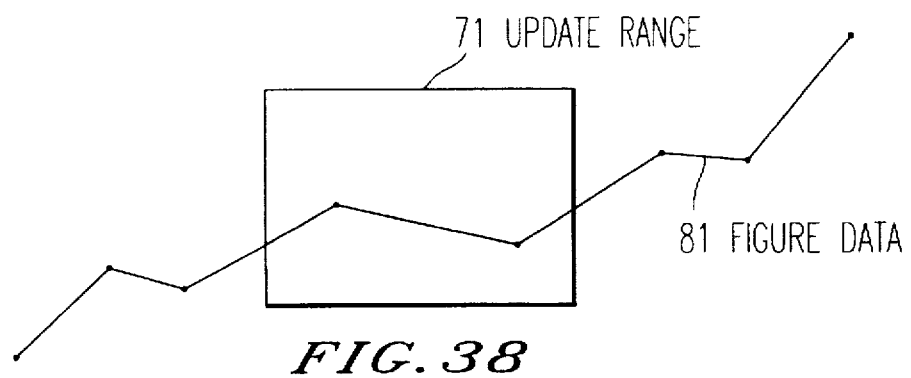
FIG. 38 is a figure showing a relationship between the retrieval range 71 and the figure data 81 to be transmitted.

Comparing FIG. 32 with FIG. 31, the portions El, E2 and E3 are updated. FIG. 33 is a figure enlarging the portion G of FIG. 31. FIG. 34 is a figure enlarging the portion GI of FIG. 32. FIG. 35 is a figure showing a record of figure data representing FIG. 33. The data "−1" which indicates a solid line, the data "−16" which indicates a jump procedure, or the data "−999" which indicates an end of procedure is stored in the line type flags 86-1, 86-2 and 86-3. FIG. 36 is a figure showing a record of the figure data representing FIG. 34.

Namely, FIG. 35 shows a record of geographical data within the retrieval range G at a time when the retrieval range F1 is specified at a child station and FIG. 36 shows a record at a child station in a case where the updated geographical data sent from the parent station is displayed at a child station. In this case, the record indicated at FIG. 35 is deleted and the record indicated at FIG. 36 is displayed thereafter. In FIG. 36, 88-1, 88-2 and 88-3 denote a line type flag. For example, the data "−1" which indicates a solid line, the data "−16" which indicates a jump procedure, or the data "−999" which indicates an end of procedure is stored in the line type flags 88-1, 88-2 and 88-3. Further, as indicated in FIG. 37, there is another way in which the record is added without deleting records. When the value "−512" representing line shading procedure is stored in the line type flag 89-1, the data indicated at FIG. 35 is displayed on a display screen in the same color as that of the background. On the other hand, when the value "−1" representing a solid line is stored in the line type flag 89-3, only the data indicated in FIG. 36 is displayed on a screen as shown in FIG. 34.

Figure 39:
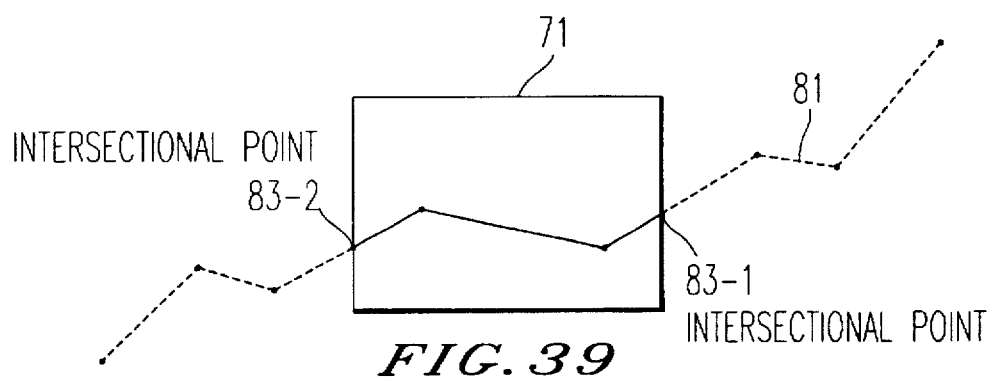
FIG. 39 is a figure showing a relationship between the retrieval range 71 and the figure data 81 to be transmitted.

In the above explained second embodiment, although all of the figure data 81 including the update range 71 is transmitted from the parent station 1 to a child station as it is (Japanese Patent Application Laid-Open No. 108729/93), only the portion concerning the retrieval range 71 out of the figure data 81 may be transmitted by finding the intersectional points 83-1 and 83-2 of the frame of the retrieval range 71 and the figure data 81 as shown in FIG. 39 (Japanese Patent Application No. 72953/92).

Figure 40:
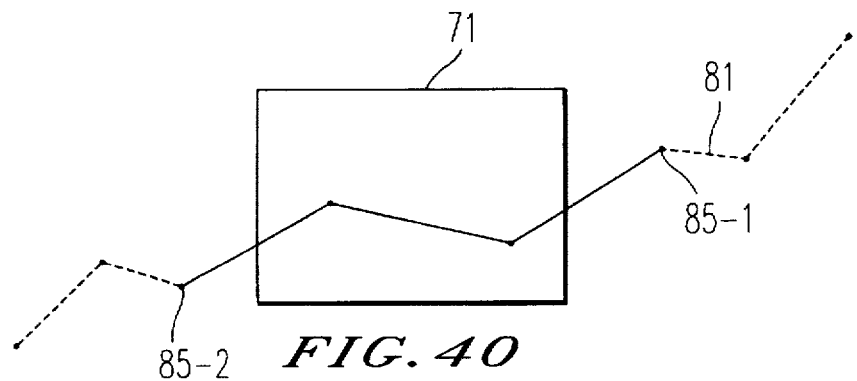
FIG. 40 is a figure showing a relationship between the retrieval range 71 and the figure data 81 to be transmitted.

Further, as shown in FIG. 40, the minimum portion represented by the coordinate points 85-1 to 85-2 of the figure data which is included in the retrieval range 71 may be transmitted (Japanese Patent Application 112775/93).

Figure 41:
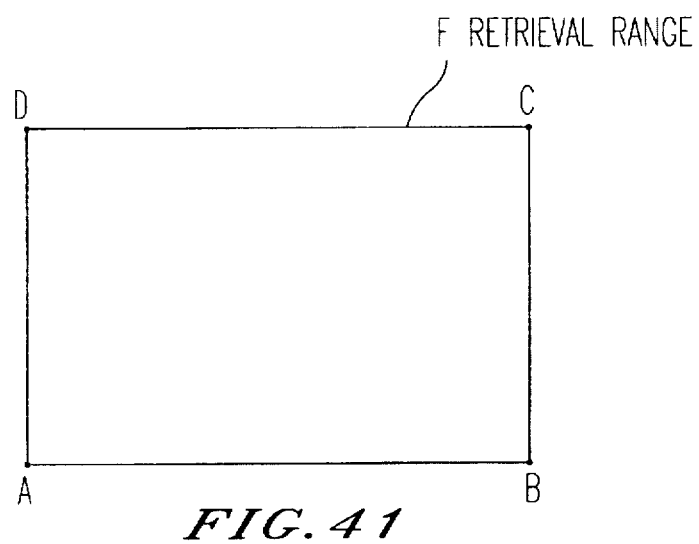
FIG. 41 is a figure showing the retrieval range F.
Figure 42:
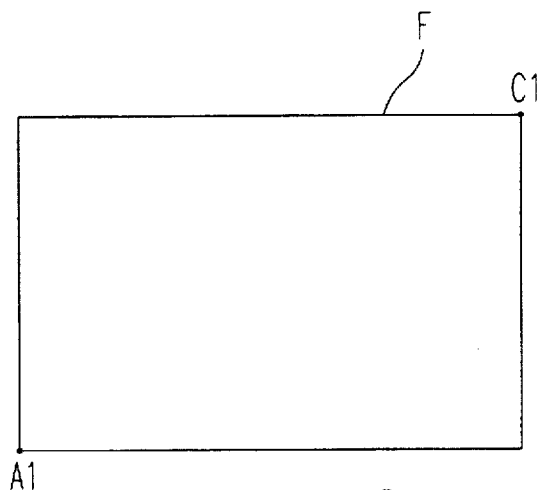
FIG. 42 is a figure showing the retrieval range F.
Figure 43:
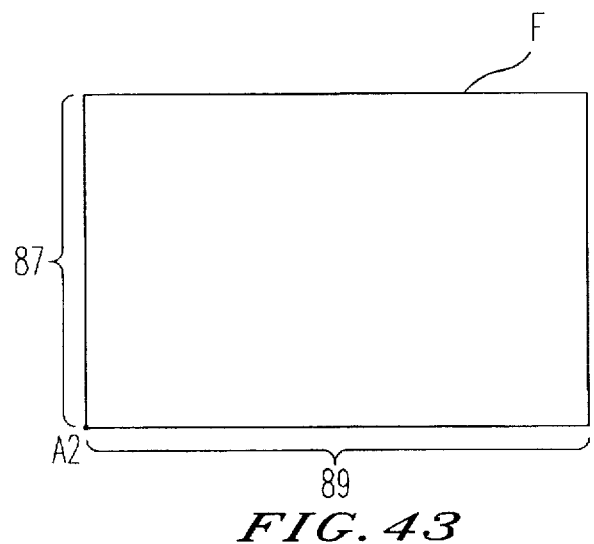
FIG. 43 is a figure showing the retrieval range F.

Furthermore, in the second embodiment, although the rectangular retrieval range F is represented by the values of the four coordinate points A, B, C and D as shown in FIG. 41, the retrieval range may be represented by two points A1 and C1 on an orthogonal line, each of which has the maximum values or minimum values of the retrieval range F as shown in FIG. 42. Further, the retrieval range F may be represented by the lengths of two sides 87, 89 and the intersectional point of the two sides 87 and 89, i.e., the point A2 having minimum values of the rectangular area as shown in FIG. 43. The update range may be specified in a similar manner.

As explained above, in the second embodiment, the quantity of the figure data to be transmitted may be reduced as compared with the first embodiment because figure data within the update range is transmitted from the parent station to a child station.

Figure 44:
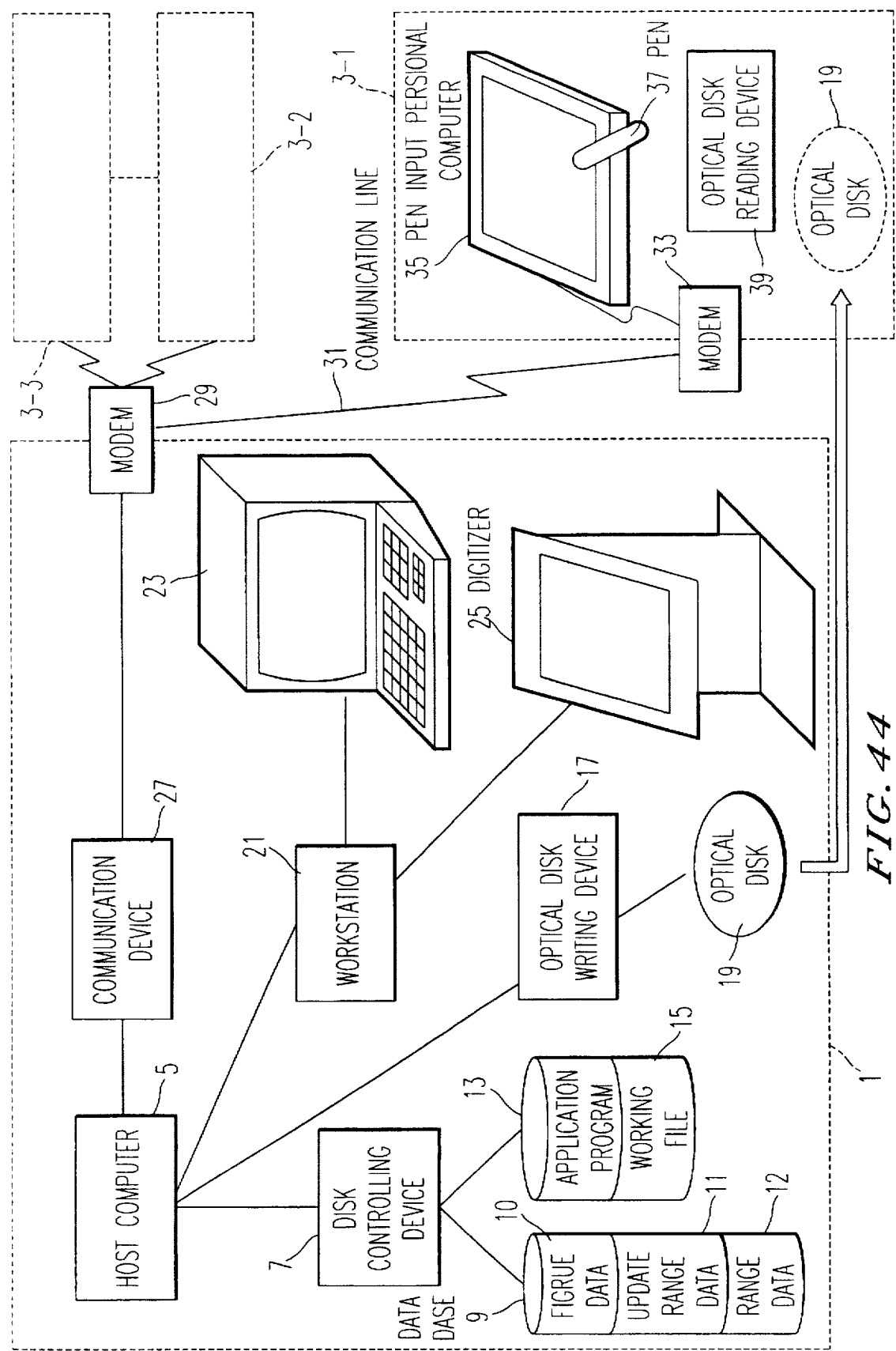
FIG. 44 is a figure showing a hardware configuration of the figure data transmitting system according to the third embodiment.

Next, the third embodiment will be explained. The configuration and the operation of the third embodiment different from those of the second embodiment will be explained below. FIG. 44 is a figure showing a configuration of the figure data transmitting system according to the third embodiment. In the third embodiment, the data base 9 stores the figure data 10 which consists of geographical data such as roads and facility data such as gas pipes, update range data 11 indicating an update range in a case where the figure data 10 is updated, and updated data 12 which is an updated figure data.

Figure 45:
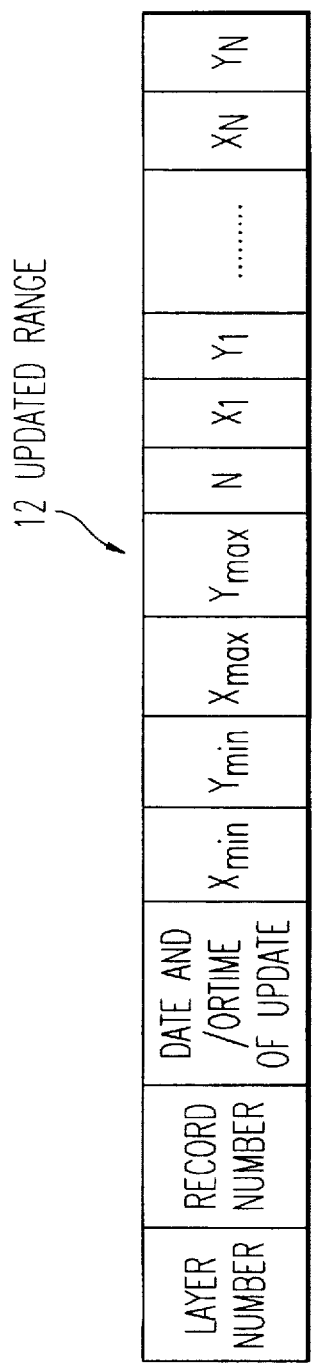
FIG. 45 is a figure showing a record of the update data 12.

FIG. 45 is a figure showing a record format of the updated data 12. The record format of the updated data is similar to the record format of the figure data 10. When the figure data is updated at the parent station, the updated figure data is stored in the data base 9 as the updated data 12 separately from the original figure data 10.

In the processing of data at the parent station 1, when the figure data 10 is updated, the application program 13 stores the update range data 11 and the updated figure data (updated data) 12 at different areas of the data base 9, respectively.

The communication between the child station 3 and the parent station 1 is almost the same as that of the second embodiment. However, the step 513 of FIG. 25 in the second embodiment will be replaced by the step in which the date and/or time at a time when the data 61 for extraction is updated is earlier than the date and/or time at a time when the update range data 11, updated data 12 and the update range data 11 in the data base 9 are stored in the working file 15 as a transmission data. The other steps are almost the same as those of the second embodiment.

In the third embodiment, the data processing at the parent station 1 is expedited as compared with the second embodiment because the parent station 1 retains the updated data 12.

Further, in the above explained embodiments employ the optical disk 19. However, a magneto-optical disk, an IC card, or magnetic disk may be used in place of the optical disk 19.

Figure 46:
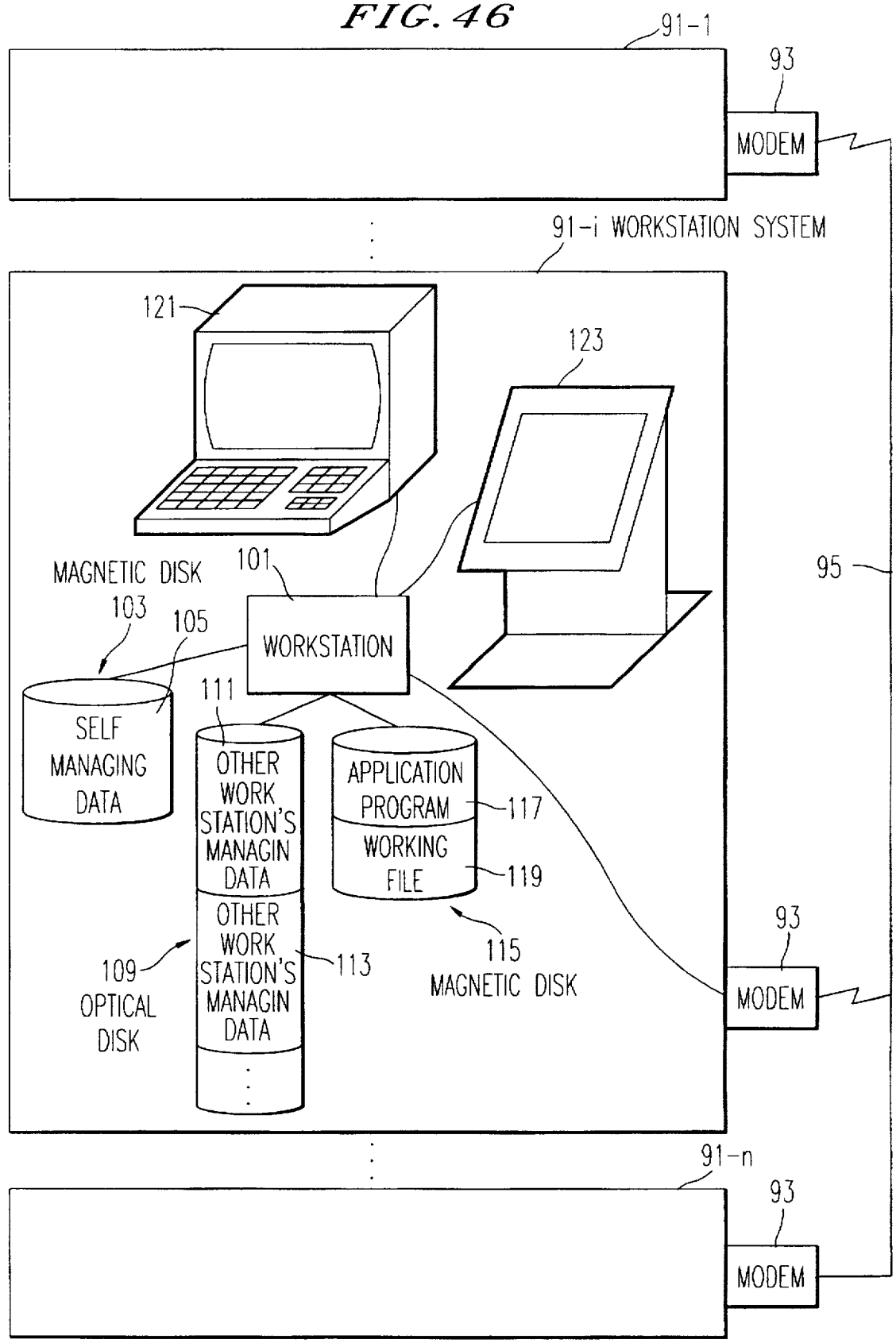
FIG. 46 is a figure showing a hardware configuration of a distributed type figure data transmitting system.

The above explained embodiments may be applied to a distributed type system. FIG. 46 is a figure showing a system configuration in a case where the first embodiment is applied to a distributed type system. In this distributed type system, a plurality of the workstations 91-1, 91-2, . . . , 91-n are connected each other by the communication line 95 and each workstation 91 has a regionally divided figure data.

Taking a workstation system 91-i as an example, the workstation system 91-i includes the workstation 101, the magnetic disk 103, the optical disk 109, the magnetic disk 115, the terminal device 121 and the digitizer 123. The magnetic disk 103 is regionally divided and each workstation system retains the figure data assigned to each workstation system (self managing data 105). The other workstation's managing data 111, 113, . . . is included in the optical disk 109. The other workstation's managing data 111 is sent as an optical disk from the workstation system 91-1 for example in every predetermined period of time e.g., once a year, for example and the figure data assigned to the workstation system 91-1 is written therein. Similarly, the other workstation's managing data 113 is sent as an optical disk from the workstation system 91-2 in every predetermined period of time and the figure data assigned to the workstation system 91-1 is written therein. The workstation system 91-i is connected to the other workstation systems via the modem 93 and the communication line 95.

For example, when, at the workstation system 91-i, the figure data assigned to the other work station 91-1 is retrieved, retrieval range is specified at the workstation system 91-i and the data for extraction is sent to the workstation system 91-1. In the workstation system 91-1, it is judged whether updated data exists within the retrieval range or not. If the updated data exists, the updated data is sent to the workstation system 91-i.

FIG. 47 is a figure showing a system configuration in a case where the second embodiment is applied to the distributed type system. In this distributed type system, a plurality of the workstations 91-1, 91-2, . . . , 91-n are connected each other by the communication line 95 and each workstation 91 has a regionally divided figure data and the update range data. Namely, the magnetic disk 103 retains regionally divided figure data which is assigned to each workstation system (self managing data 105) and the update range data 107 indicating a update range in a case where the regionally divided figure data is updated.

The other workstation's managing data 111, 113, . . . is included in the optical disk 109. The other workstation's managing data 111 is sent as an optical disk from the workstation system 91-1, for example, in every predetermined period of time e.g., once a year, for example, and the figure data assigned to the workstation system 91-1 and update range data are written.

For example, when, at the workstation system 91-i, the figure data assigned to the other work station 91-1 is retrieved, retrieval range is specified at the workstation system 91-i and the data for extraction is sent to the workstation system 91-1. In the workstation system 91-1, it is judged whether update range data exists within the retrieval range or not. If the updated data exists, the updated data is sent to the workstation system 91-i.

FIG. 48 is a figure showing a system configuration in a case where the third embodiment is applied to the distributed type system. In this distributed type system, a plurality of the workstations 91-1, 91-2, . . . , 91-n are connected each other by the communication line 95 and each workstation 91 has a regionally divided figure data, the update range data and updated data. Namely, the magnetic disk 103 retains regionally divided figure data which is assigned to each workstation system (self managing data 105), the update range data 107 indicating an update range in a case where the regionally divided figure data is updated, and the updated data 108 which is an updated self managing data. The other workstation's managing data 111, 113, . . . is included in the optical disk 109. The other workstation's managing data 111 is sent as an optical disk from the workstation system 91-1, for example, in every predetermined period of time e.g., once a year, for example, the figure data assigned to the workstation system 91-1, and the updated data and update range data are written therein.

For example, when, at the workstation system 91-i, the figure data assigned to the other work station 91-1 is retrieved, retrieval range is specified at the workstation system 91-i and the data for extraction is sent to the workstation system 91-1. In the workstation system 91-1, it is judged whether update range data exists within the retrieval range or not. If the updated data exists, the updated data 108 is sent to the workstation system 91-i.

Additionally, each of above embodiments is explained in connection with mapping system. However, the present invention may be applied to a navigation system to be installed on a car for example.

As explained above, the figure data transmitting system according to the present invention is utilized as a mapping system or a navigation system comprising a parent station and a child station wherein the data is transferred between the parent station and a child station using a CD-ROM and so forth.

We claim:

1. A figure data transmitting system having a parent station and a child station, the parent station storing a figure data with a date and/or time of updating the figure data, the figure data stored in the parent station being always updated, the figure data and the date and/or time of update at the parent station being recorded into a recording medium which is sent to the child station at regular intervals, the child station storing the figure data and the date and/or time of update recorded in the recording medium which is sent from the parent station the system comprising:

means provided at the child station for specifying a retrieval range at the child station and for transmitting the retrieval range and a data and/or time of updating the figure data at the child station to the parent station;

judging means provided at the parent station for receiving the retrieval range and the date and/or time transmitted from the child station, for comparing the date and/or time of update transmitted from the child station with a date and/or time of update at the parent station and for judging whether there exists a figure data updated after the date and/or time of update at the child station;

transmitting means provided at the parent station for transmitting an updated figure data at the child station when there exists the figure data updated after the date and/or time of update at the child station within the retrieval range; and displaying means provided at a child station for displaying the updated figure data transmitted from the parent station when there exists the figure data updated after the date and/or time of update at the child station and for displaying the figure data stored in the child station when there exists no figure data updated after the date and/or time of update at the child station.

2. A figure data transmitting system according to claim 1, wherein the parent station stores an update range data indicating a range of an updated figure data, wherein the judging means of the parent station receives the retrieval range and the date and/or time transmitted from the child station, compares the retrieval range with the update range data, compares a date and/or time of an update of an update range data at the parent station with the date and/or time of update transmitted from the child station, and judges whether there exists a figure data updated after the date and/or time of update at the child station within the retrieval range, wherein the transmitting means transmits an update range data and an updated figure data within an update range to the child station when there exists the figure data updated after a date and/or time of update at the child station within the retrieval range, and wherein the displaying means displays the figure data within an update range transmitted from the parent station.

3. A figure data transmitting system according to claim 2, wherein the parent station stores an update data which is an updated figure data, wherein the judging means of the parent station receives the retrieval range and the date and/or time transmitted from the child station, compares the retrieval range with the update range data, compares a date and/or time of an update of an update range data at the parent station with the date and/or time of update transmitted from the child station, and judges whether there exists whether there exists an update data updated after the date and/or time of update at the child station within the retrieval range, wherein the transmitting means transmits an update range data and an updated data within the update range to the child station when there exists the update data after a date and/or time of update at the child station within the retrieval range and wherein the displaying means displays the update data within an update range transmitted from the parent station.

4. A figure data transmitting system according to claim 2, wherein the update range is specified with coordinate values of four vertices of a rectangular area.

5. A figure data transmitting system according to claim 2, wherein the update range is specified with coordinate values of two orthogonal vertices of a rectangular area.

6. A figure data transmitting system according to claim 2, wherein the update range is specified with lengths of two adjacent sides of a rectangular area and coordinate values of an intersectional point of the two adjacent sides.

7. A figure data transmitting system according to claim 2, wherein the displaying means of the child station displays an updated figure data transmitted from the parent station after deleting a figure data within the update range.

8. A figure data transmitting system according to claim 2, wherein the display means of the child station displays an figure data within an update range in a background color and displays an updated figure data transmitted from the parent station.

9. A figure data transmitting system according to claim 1, wherein the figure data includes a geographical data and a facility data.

10. A figure data transmitting system according to claim 1, wherein the retrieval range is specified with coordinate values of four vertices of a rectangular area.

11. A figure data transmitting system according to claim 1, wherein the retrieval range is specified with coordinate values of two orthogonal vertices of a rectangular area.

12. A figure data transmitting system according to claim 1, wherein the retrieval range is specified with lengths of two adjacent sides of a rectangular area and coordinate values of an intersectional point of the two adjacent sides.

13. A figure data transmitting system according to claim 1, wherein the updated figure data transmitted from the parent station to the child station is a figure data stored in the parent station itself.

14. A figure data transmitting system according to claim 1, wherein the updated figure data to be transmitted from the parent station to the child station is the coordinate points of a figure data within the retrieval range and the intersectional points which are obtained by calculating intersectional points of a frame for the retrieval range and a figure data.

15. A figure data transmitting system according to claim 1, wherein the updated figure data consists of a series of minimum number of coordinate points which include the retrieval range out of the figure data represented by coordinate points and stored at the parent station.

16. A figure data transmitting system according to claim 1, wherein the displaying means of the child station displays an updated figure data transmitted from the parent station after deleting a figure data within the retrieval range.

17. A figure data transmitting system according to claim 1, wherein the displaying means of the child station displays a figure data within the retrieval range in a background color and displays an updated figure data transmitted from the parent station.

18. A figure data transmitting system having a plurality of stations a regionally divided figure data apportioned to each station, a station storing the figure data with a date and/or time of update which is apportioned to the station, the figure data apportioned to each station being always updated, the figure data and the date and/or time of update stored in each station being recorded into a recording medium, the recording medium being sent to the other stations at regular intervals, the figure data and the date and/or time recorded into the medium which is sent from a station being stored in another station, to the system comprising;

judging means provided at the second station for receiving the retrieval range and the date and/or time of update transmitted from a first station, for comparing the date and/or time of update transmitted from the first station with a date and/or time of update at the second station and for judging whether there exists a figure data updated after the date and/or time of update at the first station within the retrieval range or not;

transmitting means provided at the second station for transmitting an updated figure data to the first station when there exists the figure data updated after the date and/or time of update at the first station within the retrieval range; and displaying means provided at the first station for displaying the updated figure data transmitted from the second station when there exists the figure data updated after the date and/or time of update at the first station and for displaying the figure data stored in the first station when there exists no figure data updated after the date and/or time of update at the first station.

19. A figure data transmitting system according to claim 18, wherein the data base of each station stores an update range data indicating a range of the updated figure, wherein the judging means of the second station receives the retrieval range and the date and/or time transmitted from the first station, compares the retrieval range with the update range data, compares a date and/or time of an update of an update range data at the second station with a date and/or time of update transmitted from the first station, and judges whether there exists a figure data updated after the date and/or time of update at the first station within the retrieval range, wherein the transmitting means transmits an update range data and an updated figure data within an update range to the first station when there exists the figure data updated after the date and/or time of update at the first station within the retrieval range, and wherein the displaying means at the first station displays the figure data within the update range transmitted from the second station.

20. A figure data transmitting system according to claim 19, wherein the data base of each station stores update data which is an updated figure data, wherein the judging means of the second station receives the retrieval range and the date and/or time of an update transmitted from the first station, compares the retrieval range with the update range data, compares a date and/or time of an update of an update range data at the second station with a date and/or time of update transmitted from the first station, and judges whether there exists an update data updated after the date and/or time of update at the first station within a retrieval range, wherein the transmitting means transmits an update range data and an updated figure data within an update range to the first station when there exists the figure data updated after a date and/or time of update at the first station within the retrieval range and wherein the displaying means displays the update data within an update range transmitted from the second station.

21. A figure data transmitting system according to claim 19, wherein the update range is specified with coordinate values of four vertices of a rectangular area.

22. A figure data transmitting system according to claim 19, wherein the update range is specified with coordinate values of two orthogonal vertices of a rectangular area.

23. A figure data transmitting system according to claim 19, wherein the update range is specified with lengths of two adjacent sides of a rectangular area and coordinate values of an intersection point of the two adjacent sides.

24. A figure data transmitting system according to claim 19, wherein the display means of the child station displays an updated figure data transmitted from the parent station after deleting a figure data within the update range.

25. A figure data transmitting system according to claim 19, wherein the display means of the child station displays an figure data within an update range in a background color and displays an updated figure data transmitted from the parent station.

26. A figure data transmitting system according to claim 18, wherein the figure data includes a geographical data and a facility data.

27. A figure data transmitting system according to claim 18, wherein the retrieval range is specified with coordinate values of four vertices of a rectangular area.

28. A figure data transmitting system according to claim 18, wherein the retrieval range is specified with coordinate values of two orthogonal vertices of a rectangular area.

29. A figure data transmitting system according to claim 18, wherein the retrieval range is specified with lengths of two adjacent sides of a rectangular area and coordinate values of an intersectional point of the two adjacent sides.

30. A figure data transmitting system according to claim 18, wherein the updated figure data transmitted from the second station to the first station is a figure data stored in the data base.

31. A figure data transmitting system according to claim 18, wherein the updated figure data to be transmitted from the second station to the first station is the coordinate points of a figure data within the retrieval range and the intersectional points which are obtained by calculating intersectional points of a frame of the retrieval range and a figure data.

32. A figure data transmitting system according to claim 18, wherein the updated figure data consists of a series of minimum number of coordinate points which include the retrieval range out of the figure data represented by coordinate points and stored at the second station.

33. A figure data transmitting system according to claim 18, wherein the displaying means of the child station displays an updated figure data transmitted from the second station after deleting a figure data within the retrieval range.

34. A figure data transmitting system according to claim 18, wherein the displaying means of the first station displays a figure data within the retrieval range in a background color and displays an updated figure data transmitted from the second station.

* * * * *